(12) United States Patent
Inaba

(10) Patent No.: US 9,460,842 B2
(45) Date of Patent: Oct. 4, 2016

(54) REACTOR, COIL MOLD PRODUCT, CONVERTER, AND POWER CONVERTER APPARATUS

(71) Applicants: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

(72) Inventor: Kazuhiro Inaba, Osaka (JP)

(73) Assignees: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

( * ) Notice: Subject to any disclaimer, the term of this patent is extended or adjusted under 35 U.S.C. 154(b) by 242 days.

(21) Appl. No.: 14/357,755

(22) PCT Filed: Nov. 1, 2012

(86) PCT No.: PCT/JP2012/078366
§ 371 (c)(1),
(2) Date: May 12, 2014

(87) PCT Pub. No.: WO2013/073384
PCT Pub. Date: May 23, 2013

(65) Prior Publication Data
US 2014/0320256 A1    Oct. 30, 2014

(30) Foreign Application Priority Data

Nov. 14, 2011 (JP) ................................. 2011-249055
Sep. 24, 2012 (JP) ................................. 2012-209992

(51) Int. Cl.
*H01F 17/04* (2006.01)
*H01F 27/28* (2006.01)
(Continued)

(52) U.S. Cl.
CPC ............ *H01F 27/00* (2013.01); *H01F 27/022* (2013.01); *H01F 37/00* (2013.01); *H02M 3/1588* (2013.01); *Y02B 70/1466* (2013.01)

(58) Field of Classification Search
CPC ................. H01F 41/127; H01F 17/04; H01F 2017/046; H01F 27/32; H01F 2027/328

USPC ............................. 336/96, 221, 222, 223, 225
See application file for complete search history.

(56) References Cited

U.S. PATENT DOCUMENTS 2,997,526 A * 8/1961 Kessel .................... H01F 38/30
                                                                174/110 B
3,268,645 A * 8/1966 Stampfli ........... B29C 45/14639
                                                                264/272.19
(Continued)

FOREIGN PATENT DOCUMENTS

JP          60-150504 A     8/1985
JP       2007-134374 A     5/2007
(Continued)

OTHER PUBLICATIONS

International Search Report in PCT International Application No. PCT/JP2012/078366, dated Feb. 5, 2013.

*Primary Examiner* — Alexander Talpalatski
*Assistant Examiner* — Joselito Baisa
(74) *Attorney, Agent, or Firm* — Venable LLP; Michael A. Sartori; Laura G. Remus

(57) ABSTRACT

A reactor 1A of the present invention includes one coil 2 and a magnetic core 3. The coil 2 includes a turn portion 2*t* formed by a spirally wound wire 2*w* whose conductor is a rectangular wire, and draw-out portions 2*d* of the wire 2*w* drawn out from the turn portion 2*t*. The magnetic core 3 is disposed inside and outside the coil 2 to form a closed magnetic path. At least part of the outer circumference of each draw-out portion 2*d* is formed by a composite material containing magnetic substance powder and resin. The reactor 1A further includes a mold resin portion 21 that covers the outer circumference of the turn portion 2*t* and at least part of the draw-out portions 2*d* to retain the shape of the coil 2. In each corner portion region of the mold resin portion 21 covering corresponding corner portion of the wire 2*w* at each draw-out portion 2*d*, the outer circumferential face being brought into contact with the outer core portion 32 is formed by a curved surface. When the bend radius of the outer circumferential face of the corner portion region is R1, the bend radius R1 is greater than 0.5 mm.

12 Claims, 13 Drawing Sheets

(51) Int. Cl.
*H01F 27/00* (2006.01)
*H01F 37/00* (2006.01)
*H01F 27/02* (2006.01)
*H02M 3/158* (2006.01)

(56) References Cited

U.S. PATENT DOCUMENTS

| | | | | |
|---|---|---|---|---|
| 4,204,087 A | * | 5/1980 | Lin | H01B 13/0033 174/119 R |
| 4,552,990 A | * | 11/1985 | Persson | H01F 27/2823 174/117 FF |
| 5,524,334 A | * | 6/1996 | Boesel | H01F 27/022 264/272.14 |
| 5,801,334 A | * | 9/1998 | Theodorides | H02K 3/40 174/120 SR |
| 6,334,972 B1 | * | 1/2002 | Kim | H01F 27/327 264/263 |
| 6,492,892 B1 | * | 12/2002 | Brennan | H01F 27/2871 336/205 |
| 6,646,531 B2 | * | 11/2003 | Kim | H01F 27/327 336/178 |
| 6,663,816 B2 | * | 12/2003 | Younsi | H02K 3/14 264/272.19 |
| 6,870,292 B2 | * | 3/2005 | Owada | H02K 3/24 310/194 |
| 7,135,782 B2 | * | 11/2006 | Nishikawa | H01L 23/564 257/692 |
| 7,238,888 B2 | * | 7/2007 | Goto | H01F 5/04 174/129 R |
| 2002/0089403 A1 | * | 7/2002 | Kim | H01F 27/327 336/90 |
| 2003/0098630 A1 | * | 5/2003 | Owada | H02K 3/24 310/194 |
| 2005/0104708 A1 | * | 5/2005 | Goto | H01F 5/04 336/225 |
| 2010/0194516 A1 | * | 8/2010 | Sato | H01F 1/24 336/221 |

FOREIGN PATENT DOCUMENTS

| | | |
|---|---|---|
| JP | 2008-192649 A | 8/2008 |
| JP | 2010-055965 A | 3/2010 |
| JP | 2010-232421 A | 10/2010 |
| JP | 2011-100842 A | 5/2011 |
| JP | 2011-124310 A | 6/2011 |
| WO | WO-2011/013394 A1 | 2/2011 |

* cited by examiner

20D: 2, 21, 31

REACTOR, COIL MOLD PRODUCT, CONVERTER, AND POWER CONVERTER APPARATUS

TECHNICAL FIELD

The present invention relates to a reactor used as a constituent component of a power converter apparatus such as an in-vehicle DC-DC converter mounted on a vehicle such as a hybrid vehicle, a coil mold product suitable as a constituent component of the reactor, a converter including the reactor, and a power converter apparatus including the converter. In particular, the present invention relates to a reactor whose resin containing mold product is not easily damaged.

BACKGROUND ART

A reactor is one of the components of a circuit that performs a voltage step up or step down operation. The reactor is used for a converter mounted on a vehicle such as a hybrid vehicle. The reactor is disclosed in, for example, Patent Literature 1.

The reactor disclosed in Patent Literature 1 has the structure in which a combined product made up of a coil and a magnetic core is stored in a case. The coil is formed by a wound wire being a rectangular wire. The magnetic core includes a circular cylindrical inner core portion disposed inside the coil, and a coupled core portion (an outer core portion) that is formed by a molded composite material which is a mixture of magnetic substance powder and resin, the coupled core portion being disposed at the outer circumference of the coil. Patent Literature 1 discloses formation of an inner resin portion (a mold resin portion) made of an insulating resin on the surface of the coil, which secures insulation between the coil and the magnetic core.

In connection with the reactor of Patent Literature 1, in the magnetic core, the outer core portion disposed at the outer circumference of the coil is formed by the composite material of magnetic substance powder and resin. Other known mode of the reactor includes the structure in which a combined product, in which a coil is disposed at an annular magnetic core, is stored in a case. The surrounding of the combined product (a coil) is sealed by a sealing resin by potting. In other structure, the surrounding of the combined product (the coil) is molded by a sealing resin using a mold assembly, thereby achieving sealing (e.g., see Patent Literature 2).

CITATION LIST

Patent Literature

Patent Literature 1: Japanese Unexamined Patent Publication No. 2011-124310
Patent Literature 2: Japanese Unexamined Patent Publication No. 2007-134374

SUMMARY OF INVENTION

Technical Problem

When any portion in the coil that may possibly be brought into contact with the magnetic core is covered by an insulating resin as described above, insulation between the coil and the magnetic core can be enhanced. Accordingly, when the outer core portion is formed by the composite material as described above, in the coil, it is desired to cover by an insulating resin, of course the turn portion formed by the wound wire, and also the regions of the draw-out portions of the wire that are brought into contact with the outer core portion, the draw-out portions being drawn out from the turn portion and connected to terminal fittings. When the mold resin portion is formed so as to conform to the outer shape of the coil, the mold resin portion is formed so as to also conform to the rectangular wire at the draw-out portions. Therefore, the outer shape becomes similar to the rectangular wire. However, in this situation, a crack may occur at the outer core portion formed by the composite material. The coil of the reactor repeats thermal expansion and contraction in accordance with the heat cycle, i.e., the temperature rises when the coil is energized, and lowers when the power is stopped. Further, when the coil is supplied with alternating current and excited, vibrations occur. Thus, because of the difference in the thermal expansion coefficient between the coil and the outer core portion (the magnetic core) or because of the vibrations, a corner portion of the mold resin portion may become the origin of a crack in the outer core portion that is in contact with the corner portion.

Further, in the structure in which the surrounding of the combined product is sealed by the sealing resin, the draw-out portions of the wire of the coil are drawn out from the sealing resin, and part of the outer circumference of the draw-out portions is covered by the sealing resin. That is, the draw-out portions are brought into contact with the sealing resin. In this situation also, when the mold resin portion is formed so as to cover the draw-out portions of the wire, as described above, because of the difference in the thermal expansion coefficient between the coil and the sealing resin or because of the vibrations, the corner portion of the mold resin portion may become the origin of a crack in the sealing resin that is in contact with the corner portion.

The present invention has been made in consideration of the foregoing circumstances, and an object of the present invention is to provide a reactor whose resin containing mold product is not easily damaged.

Another object of the present invention is to provide a coil mold product suitable for structuring the reactor.

Still another object of the present invention is to provide a converter including the reactor, and a power converter apparatus including the converter.

Solution to Problem

The present invention achieves the objects stated above by employing a prescribed curved surface to form, in a mold resin portion covering the surface of a coil, the portion that is brought into contact with a resin containing mold product (e.g., an outer core portion formed by a composite material containing magnetic substance powder and resin (a magnetic core) or a sealing resin), and where a corner portion becoming the origin of a crack in the resin containing mold product is formed. Specifically, a prescribed curved surface is employed to form the corner portion of the mold resin portion covering each draw-out portion of the coil, which is greatly subjected to the thermal expansion and contraction of the coil associated with the heat cycle or the vibrations invited by the coil being supplied with alternating current and excited.

The reactor of the present invention includes a coil and a magnetic core. The coil includes a turn portion formed by a wound wire whose conductor has a cross-sectional shape with a corner portion, and a draw-out portion of the wire drawn out from the turn portion. The magnetic core is disposed inside and outside the coil to form a closed magnetic path. The reactor of the present invention further includes a mold resin portion that covers the turn portion and at least part of the draw-out portion to retain the shape of the coil. The reactor of the present invention further includes a resin containing mold product that is formed to cover at least part of the outer circumference of the mold resin portion covering the draw-out portion and that contains resin. In the mold resin portion, an outer circumferential face of a corner portion region that covers a corner portion of the draw-out portion is formed by a curved surface. When the bend radius of the outer circumferential face of the corner portion region is R, the bend radius R is greater than 0.5 mm.

As a constituent member of the reactor of the present invention, the following coil mold product of the present invention can be suitably used. A coil mold product of the present invention includes a coil and a mold resin portion. The coil includes a turn portion formed by a wound wire whose cross-sectional shape has a corner portion and a draw-out portion of the wire drawn out from the turn portion. The mold resin portion covers the turn portion and at least part of the draw-out portion to retain the shape of the coil. The coil mold product is used as a constituent member of a reactor. In the mold resin portion, the outer circumferential face of a corner portion region that covers a corner portion of the draw-out portion is formed by a curved surface. When the bend radius of the curved surface of the corner portion region is R, the bend radius R is greater than 0.5 mm.

In connection with the reactor of the present invention, in the mold resin portion covering the draw-out portion, the bend radius of the outer circumferential face of the corner portion region, which tends to become the origin of a crack in the resin containing mold product and which has its outer circumference covered by the resin containing mold product (e.g., the composite material containing magnetic substance powder and resin or a sealing resin), falls within the range noted above. Therefore, an occurrence of a crack or the like in the resin containing mold product can be suppressed. This is achieved by the outer circumferential face of the corner portion region being formed by a curved surface, which contributes toward suppressing the stress concentration associated with the thermal expansion and contraction caused by the heat cycle or vibrations invited by the coil being supplied with alternating current and excited, in the draw-out portion that is in contact with the outer circumferential face of the corner portion region in the resin containing mold product and that is greatly subjected to such thermal expansion and contraction and vibrations. As a result, the portion of the resin containing mold product in contact with the outer circumferential face of the corner portion region will not easily become the origin of a crack. Hence, the resin containing mold product is not easily damaged.

As described above, in connection with the coil mold product of the present invention, the outer circumferential face of the corner portion region is formed by a curved surface. Therefore, for example, when the magnetic core is formed such that at least the outer circumferential side of the draw-out portion is formed by a composite material containing magnetic substance powder and resin, an occurrence of a crack or the like in the magnetic core being a resin containing mold product can be suppressed. Further, when the combined product made up of the coil and the magnetic core is sealed by a sealing resin such that at least the outer circumferential side of the draw-out portion is formed by the sealing resin, an occurrence of a crack or the like in the sealing resin being the resin containing mold product can be suppressed. Accordingly, the coil mold product can be suitably used for structuring the reactor.

As one mode of the reactor of the present invention, in the magnetic core, the outer circumferential side of the draw-out portion may be formed by a composite material containing magnetic substance powder and resin. That is, in this mode, the resin containing mold product is the composite material.

As one mode of the reactor of the present invention and the coil mold product of the present invention, the wire may be formed by a rectangular wire. When the thickness of the rectangular wire is a and the thickness of the mold resin portion covering the draw-out portion is m, the bend radius R may be $0.2(m+(a/2)) \leq R \leq 5.0(m+(a/2))$.

With the structure described above, setting the bend radius R to $0.2(m+(a/2))$ or more, the sharpness of the corner portion at the outer circumferential face in the corner portion region can be reduced, and an occurrence of a crack or the like in the magnetic core can be suppressed. On the other hand, setting the bend radius R to $5.0(m+(a/2))$ or less, the effect of suppressing an occurrence of a crack in the resin containing mold product can be obtained, while preventing the outer circumferential shape of the mold resin portion covering the draw-out portion from greatly deviating from the outer circumferential shape of the wire. Further, since the thickness of the mold resin portion does not become excessively thin, a reduction in insulation between the wire and the magnetic core can be suppressed.

As one mode of the reactor of the present invention and the coil mold product of the present invention, the mold resin portion may be molded using a mold assembly. The bend radius of the outer circumferential face of the corner portion region may be greater than a bend radius of a mold releasing purpose curved surface that is formed at a corner portion of an assembled product including the coil and the mold resin portion, in order to release the assembled product from the mold assembly.

With the structure described above, in the mold resin portion covering the draw-out portion, the outer circumferential face of the corner portion region that tends to become the origin of a crack in the resin containing mold product is set to be greater than the bend radius of the mold releasing purpose curved surface. Thus, an occurrence of a crack or the like in the resin containing mold product can be suppressed.

As one mode of the reactor of the present invention and the coil mold product of the present invention, in the mold resin portion, the bend radius of an outer circumferential face of an outer circumferential edge region covering an outer circumferential edge of the turn portion may be greater than 0.5 mm.

With the structure described above, the bend radius of the outer circumferential edge region is set to be greater than 0.5 mm. Thus, the corner portion of the mold resin portion that tends to become the origin of a crack in the resin containing mold product can be reduced.

As one mode of the reactor of the present invention and the coil mold product of the present invention, in the mold resin portion, the bend radius of an outer circumferential face of an inner circumferential edge region covering an inner circumferential edge of the turn portion may be greater than 0.5 mm.

With the structure described above, the bend radius of the inner circumferential edge region is set to be greater than 0.5 mm. Thus, the corner portion of the mold resin portion that tends to become the origin of a crack in the resin containing mold product can be reduced.

As one mode of the reactor of the present invention, the magnetic core may include an inner core portion disposed inside the coil, and an outer core portion disposed outside the coil to form the closed magnetic path with the inner core portion. The inner core portion may be integrally retained with the coil by the mold resin portion.

With the structure described above, the inner core portion is integrally retained by the mold resin portion. Therefore, since the inner core portion and the coil will not be separated from each other when the reactor is assembled, the assembling work is suppressed from becoming complicated. In addition, since alignment of the inner core portion and the coil is not required, the assembling work can be simplified. Accordingly, excellent assemblability of the reactor is exhibited.

As one mode of the reactor of the present invention, the coil may include a juxtaposed pair of coil elements. With this structure, when the coil (the coil elements) is formed by the wire being spirally wound, as compared to the coil made of one linear coil element of the same turns (the number of turns), the length from one end side of the coil (the coil elements) to the other end side can be reduced. Accordingly, a reduction in size of the reactor can be achieved.

As one mode of the reactor of the present invention and the coil mold product of the present invention, a groove that surrounds the wire at an end face of the mold resin portion covering the draw-out portion may be further included.

With the structure described above, since the groove can increase the creepage distance between the draw-out portion of the wire and the resin containing mold product, particularly the outer core portion (the magnetic core), a sufficient insulation between them can be secured.

As one mode of the reactor of the present invention, the magnetic core may include the outer core portion that is disposed outside the coil and that is formed by the composite material containing magnetic substance powder and resin. At least part of the mold resin portion covering the draw-out portion is exposed outside the outer core portion.

With the structure described above, contact between the draw-out portion of the wire and the outer core portion can be avoided, whereby insulation between them can be secured.

The reactor of the present invention can be suitably used as a constituent component of a converter. A converter of the present invention includes the reactor of the present invention described above. The converter may include a switching element, a driver circuit that controls the operation of the switching element, and a reactor that smoothes the switching operation. By the operation of the switching element, an input voltage is converted.

Further, the converter of the present invention can be suitably used as a constituent component of a power converter apparatus. The power converter apparatus of the present invention includes the converter of the present invention described above. The power converter apparatus may include a converter that converts an input voltage, and an inverter that is connected to the converter to interconvert direct current and alternating current. A load is driven by the power obtained by conversion of the inverter.

With the structure described above, thanks to provision of the reactor of the present invention whose resin containing mold product is not easily damaged even when it is subjected to the thermal expansion and contraction of the coil or vibrations, the converter or the power converter apparatus can be used for a long period. Thus, they each can be suitably used as an in-vehicle component or the like which is subjected to vibrations.

Advantageous Effects of Invention

The resin containing mold product of the reactor of the present invention is not easily damaged.

Since the coil of the coil mold product of the present invention can be handled with ease, it is suitable for structuring a reactor.

The converter or the power converter apparatus of the present invention can be suitably used as an in-vehicle component or the like which is subjected to vibrations.

DESCRIPTION OF EMBODIMENTS

In the following, a description will be given of embodiments of the reactor of the present invention with reference to the drawings. Throughout the drawings, identical reference signs denote identically named elements.

First Embodiment

[Reactor]

Figure 1:
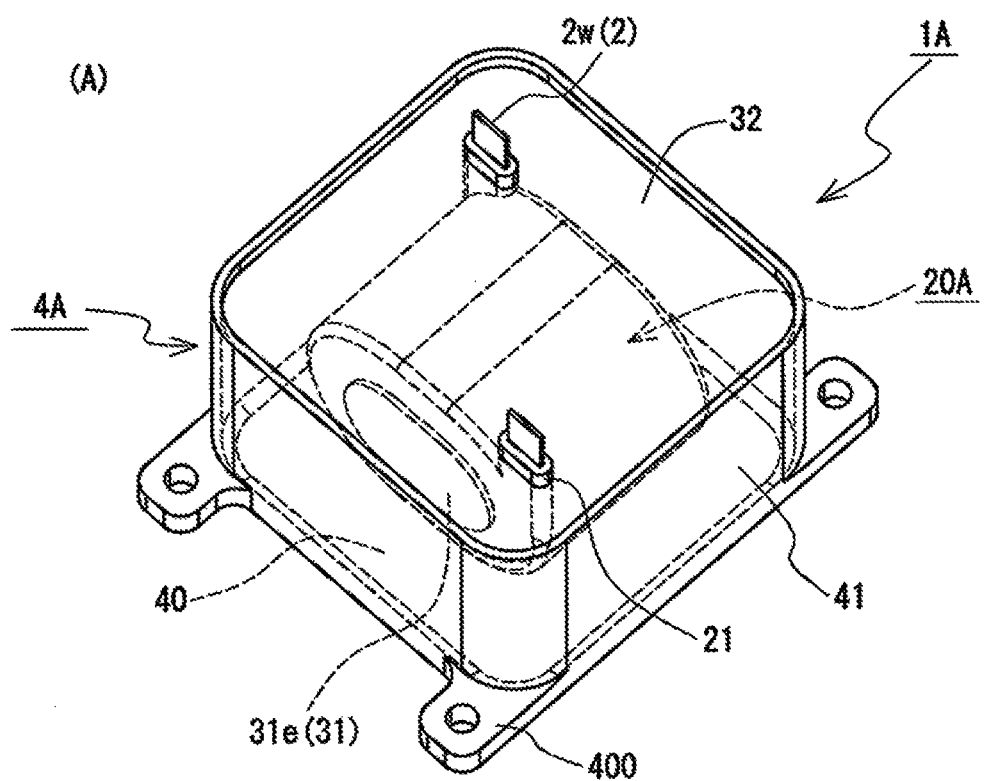
FIG. 1(A) is a schematic perspective view showing a reactor according to a first embodiment.
FIG. 1(B) is a schematic perspective view showing a coil mold product included in the reactor.
Figure 1:
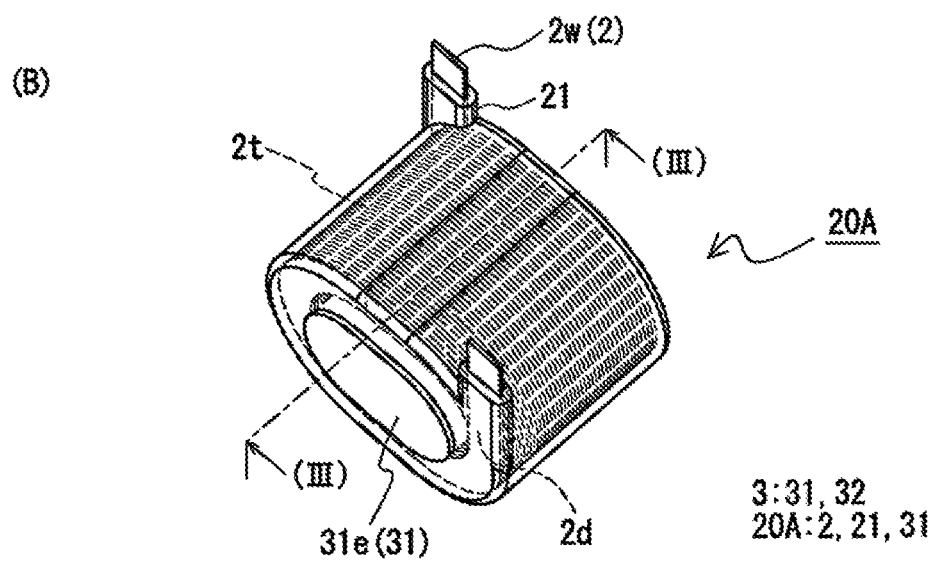
Figure 2:
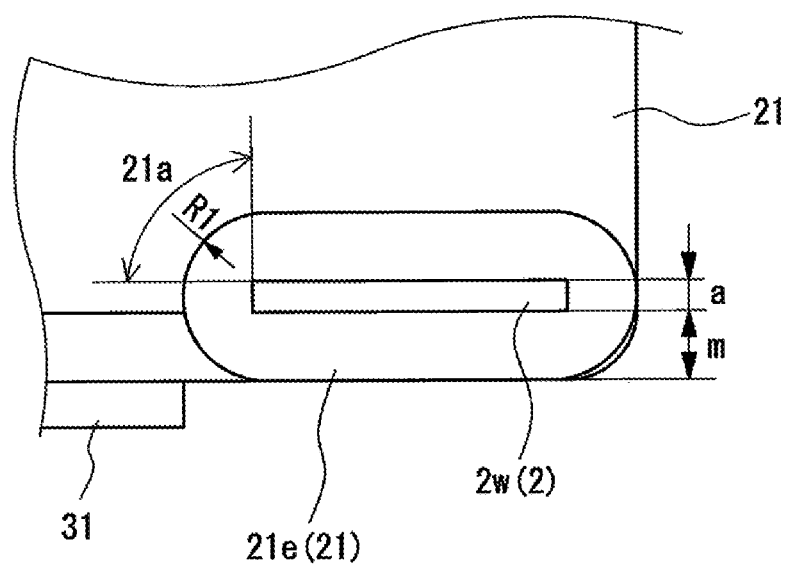
FIG. 2 is a top view showing the area near a draw-out portion of a wire in the coil mold product shown in FIG. 1(B).
Figure 3:
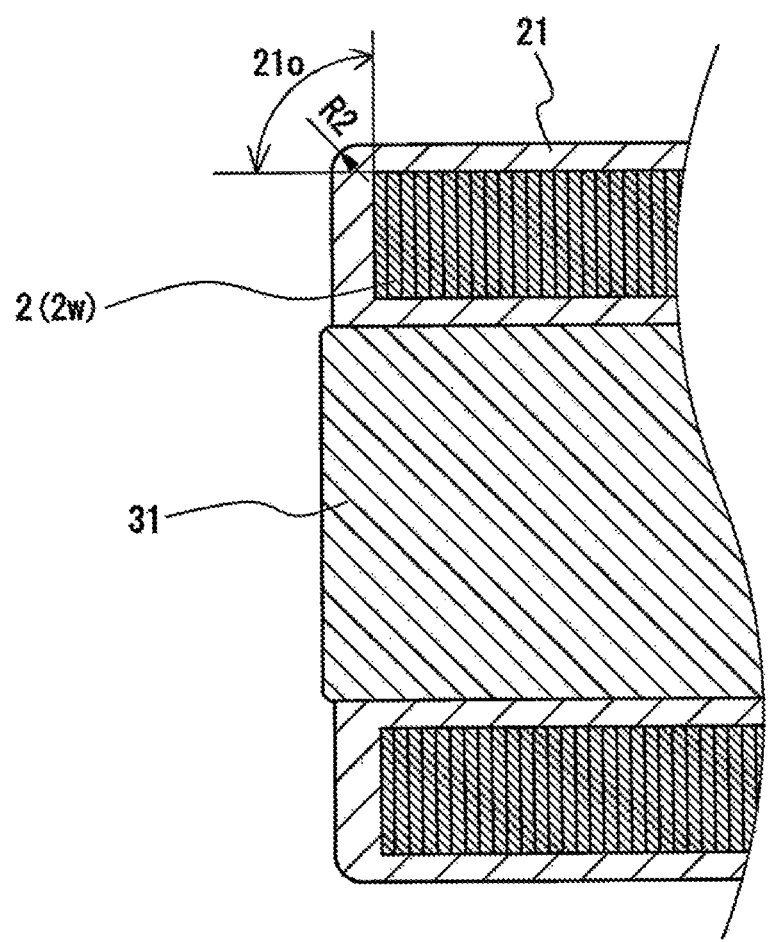
FIG. 3 is a partial cross-sectional view showing part of the cross section taken along line III-III in the coil mold product shown in FIG. 1(B).

With reference to FIGS. 1 to 3, a description will be given of a reactor 1A according to a first embodiment. The reactor 1A includes a coil mold product 20A and an outer core portion 32 (a magnetic core 3), and the coil mold product 20A and the outer core portion 32 are stored in a bottomed sleeve-like case 4A. The coil mold product 20A includes one coil 2, an inner core portion 31 in the magnetic core 3, and a mold resin portion 21 that integrally retains the coil 2 and the inner core portion 31. The coil 2 has a turn portion 2t formed by a spirally wound wire 2w and draw-out portions 2d of the wire 2w that are drawn out from the turn portion 2t (FIG. 1(B)). The mold resin portion 21 covers the turn portion 2t and at least part of the outer circumference of the draw-out portions 2d. The magnetic core 3 includes the inner core portion 31 disposed inside the coil 2 and the outer core portion 32 disposed outside the coil 2. The core portions 31 and 32 form a closed magnetic path. The outer core portion 32 is formed by a composite material (a resin containing mold product) that contains magnetic substance powder and resin. The reactor 1A is representatively used having the case 4A installed on an installation target such as a cooling base. One of the characteristics of the reactor 1A lies in that, the outer circumferential face of each corner portion region 21a of the mold resin portion 21 that covers corresponding corner portion of the wire 2w at the draw-out portions 2d of the coil 2 is formed by a curved surface (FIG. 2). In the following, each structure will be described in detail.

[Coil Mold Product]

The coil mold product 20A will be described with reference to FIG. 1(B). The coil mold product 20A included in the reactor 1A according to the first embodiment includes the coil 2, the inner core portion 31 forming the magnetic core 3, and the mold resin portion 21 that integrally retains the coil 2 and the inner core portion 31.

(Coil)

The coil 2 is a sleeve-like element that has the turn portion 2t formed by one continuous wire 2w being spirally wound, and the draw-out portions 2d of the wire 2w drawn out from the turn portion 2t. The coil 2 is formed by one coil element. As the wire 2w, a coated wire including a conductor made of a conductive material such as copper, aluminum, or alloy thereof may be preferably used. The conductor is provided with an insulating coat made of an insulating material (representatively, an enamel material such as polyamide-imide) at its outer circumference. The cross-section of the conductor may have corner portions. The conductor may be of a variety of shapes, e.g., a rectangular wire whose cross-sectional shape is rectangular, a square wire whose cross-sectional shape is square, or a deformed wire whose cross-sectional shape is a polygonal shape. Herein, the coil (coil element) 2 is an edgewise coil formed by a coated rectangular wire wound edgewise. The coated rectangular wire includes a rectangular wire having a copper-made conductor to which an enamel-made insulating coat is formed. The edgewise coil can easily increase the space factor to obtain a compact coil, and thus contributes toward a reduction in size of the reactor.

As to the dimension of the wire 2w, the thickness and width with which the edgewise winding can be performed will suffice. When the wire 2w is a rectangular wire, for example, the width w is 2.0 mm or more and 20.0 mm or less, and the thickness a is 0.5 mm or more and 2.0 mm or less. The bend radius of each corner portion of the wire 2w may be 0.5 mm or less.

The end face shape of the coil 2 can be selected as appropriate. Herein, the end face has a racetrack shape, which is formed by a combination of straight lines and arcs. At least part of the outer circumferential face of the coil 2 is formed by a flat surface. Herein, the reactor 1A according to the first embodiment is in the horizontal storage mode in which the coil 2 is stored in the case 4A such that the axis of the coil 2 becomes parallel to the outer bottom face, which is formed by a flat surface, of the case 4A. In the horizontal storage mode, since the flat surface of the outer circumferential face of the coil 2 is disposed in parallel to the outer bottom face of the case 4A, the coil 2 can be disposed in a stable manner, and the region in which the distance from the outer circumferential face of the coil 2 to the outer bottom face is short can be increased. Thus, the heat dissipating characteristic can be enhanced. Accordingly, in the horizontal storage mode, the coil in which at least part of its outer circumferential face is formed by a flat surface, such as the aforementioned racetrack shape, is preferable. Other suitable shape may include, for example, a coil whose end faces are each a polygon (e.g., a rectangle) having corner portions rounded. On the other hand, when the end face shape of the coil 2 is substantially solely made of a curve, such as a circle or an ellipse, the wire can be easily wound even when the wire is a rectangular wire. Thus, excellent manufacturability of the coil is exhibited.

In connection with the wire 2w forming the coil 2, at the region in each end portion side, a terminal member (not shown) made of a conductive material such as copper or aluminum is connected to the draw-out portion 2d drawn out as appropriate from the turn portion 2t. Via the terminal member, the coil 2 is supplied with power. The draw-out direction of the draw-out portions 2d at opposite end portions of the wire 2w can be selected as appropriate. For example, the opposite end portions of the wire 2w can be drawn out respectively at one end side and the other end side of the coil 2 as shown in the present embodiment. Further, the region on the one end portion side of the wire 2w may be extended in the radial direction on the one end side of the coil 2, while the region on the other end portion side of the wire 2w may be folded back toward the one end side of the coil 2, and then similarly extended in the radial direction. In this manner, both the end portions of the wire 2w can be disposed on the one end side of the coil 2, whereby attachment of the terminal members can be carried out with ease.

[Inner Core Portion]

The inner core portion 31 inserted and disposed inside the coil 2 is a columnar element whose outer shape conforms to the inner circumferential shape of the coil 2. Herein, the inner core portion 31 is formed by a powder magnetic core in which soft magnetic powder is used. Details thereof will be given later.

[Mold Resin Portion]

The mold resin portion 21 covers the surface of the coil 2 to retain the coil 2 in a certain shape. Accordingly, the coil 2 is not expanded or compressed thanks to the mold resin portion 21, and hence can be handled with ease during assembly or the like. Further, herein, the mold resin portion 21 also functions to retain the coil 2 in a compressed state than its natural length. Accordingly, the length of the coil 2 is shorter than its natural length, and the coil 2 is small in size. Further, since the mold resin portion 21 is made of an insulating resin and covers the surface of the coil 2, it also functions to enhance insulation between the coil 2 and the magnetic core 3. Still further, the mold resin portion 21 also functions as a member that integrally retains the coil 2 and the inner core portion 31. Accordingly, since the reactor 1A employs such a coil mold product 20A, the number of assembled components is small and excellent assemblability is exhibited.

Herein, the mold resin portion 21 covers the assembled product made up of the coil 2 and the inner core portion 31 inserted and disposed inside the coil 2, except for the opposite end portions of the wire 2w (the draw-out portions 2d) to which the aforementioned terminal members are connected and the opposite end faces 31e of the inner core portion 31. That is, the mold resin portion 21 covers the following portions of the coil 2: the inner circumferential face, the outer circumferential face, a pair of end faces, the outer circumferential edge region, and the inner circumferential edge region of the turn portion 2t; part of the outer circumference of the draw-out portions 2d; and the entire outer circumferential face of the inner core portion 31.

The region covered by the mold resin portion 21 can be selected as appropriate. For example, part of the turn portion 2t of the coil 2 may not be covered by the mold resin portion 21 and may be exposed outside. However, as in the present embodiment, when the coil 2 is substantially entirely covered, the resin forming the mold resin portion 21 is interposed between the coil 2 and the magnetic core 3. Thus, insulation relative to the coil 2 can be enhanced.

Further, herein, though the opposite end faces 31e of the inner core portion 31 and the nearby area thereof are not covered by the mold resin portion 21 and exposed outside, to be brought into contact with the composite material forming the outer core portion 32 whose description will follow, it is possible to employ the mode in which at least one end face 31e is covered by the mold resin portion 21. At this time, the resin on the end face 31e of the inner core portion 31 can be used as a gap.

Figure 7:
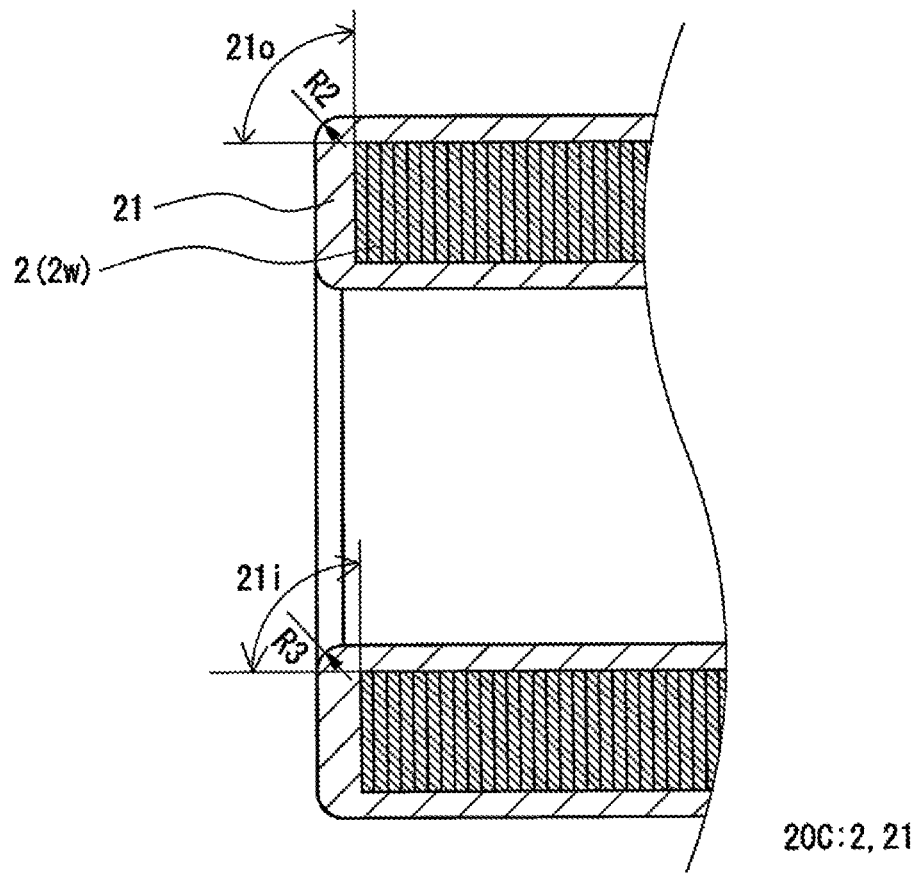
FIG. 7 is a partial cross-sectional view partially showing part of the vertical cross section of a coil mold product included in a reactor according to a third embodiment taken in parallel to the axial direction.

In connection with the regions covered by the mold resin portion 21, the portion which is brought into contact with the magnetic core 3 and where a corner portion which may become the origin of a crack in the magnetic core 3 is formed, is preferably formed by a curved surface. The specific portion where the corner portion is formed may be as follows: each corner portion region 21a covering the corresponding corner portion of the wire 2w at each draw-out portion 2d (FIG. 2); an outer circumferential edge region 21o covering the outer circumferential edge of the turn portion 2t (FIG. 3); or an inner circumferential edge region 21i covering the inner circumferential edge of the turn portion 2t, which will be described later (FIG. 7, a third embodiment). By reducing the sharpness of the corner portion of the mold resin portion 21 which is brought into contact with the magnetic core 3, an occurrence of a crack (damage) in the magnetic core 3 can be prevented.

Herein, as shown in FIG. 2, a curved surface is employed to form, in the region covered by the mold resin portion 21, at least the outer circumferential face of each corner portion region 21a covering the corresponding corner portion of the wire 2w at each draw-out portion 21d, at the portion being brought into contact with the outer core portion 32 whose description will follow. Thus, the outer core portion 32 will not easily crack. Since the outer circumferential face of the corner portion region 21a is formed by a curved surface, corner portions each becoming the origin of a crack in the outer core portion 32 are reduced at the portions being brought into contact with the outer core portion 32. In particular, the draw-out portions 2d tend to be greatly subjected to the thermal expansion and contraction attributed to the heat cycle or vibrations that occur when the coil 2 is supplied with alternating current and excited, as compared to the turn portion 2t. Accordingly, when a corner portion is present at the outer circumferential face of the mold resin portion 21 covering each draw-out portion 2d, it particularly tends to become the origin of a crack in the outer core portion 32. The corner portion region 21a as used herein refers to the region corresponding to each corner portion of the wire 2w in the mold resin portion 21 covering the outer circumference of each draw-out portion 2d of the wire 2w. That is, the corner portion region 21a refers to the mold resin portion 21 located between respective extension faces of the two faces forming a corner portion of the wire 2w. Herein, each of the four corner portion regions 21a is formed by a curved surface, and the cross-sectional shape of the mold resin portion 21 covering each draw-out portion 2d is in a substantial racetrack shape.

Generally, in order to release the coil mold product 20A molded using a mold assembly for molding the mold resin portion 21, a mold releasing purpose curved surface is formed at each corner portion of the coil mold product 20A. The mold releasing purpose curved surface is a curved surface of a small bend radius that is provided for allowing a molded product to be smoothly released from the mold assembly, thereby preventing any damage that may be done to the corner portions of the molded product. Since the bend radius is about 0.2 mm or more and 0.5 mm or less, the bend radius R1 of the outer circumferential face of the corner portion region 21a (FIG. 2) may be, for example, greater than 0.5 mm. The bend radius R1 is preferably 0.7 mm or more, 1.0 mm or more, and further preferably 1.5 mm or more. In this manner, it is preferable that the bend radius R1 of the outer circumferential face (the curved surface) of the corner portion region 21a is greater than the bend radius of the mold releasing purpose curved surface. In particular, it is preferable that the bend radius R1 satisfies the following relationship in connection with the thickness a of the wire 2w (rectangular wire) and the covering thickness m of the mold resin portion 21 covering the draw-out portions 21d: $0.2(m+(a/2)) \leq R1 \leq 5.0(m+(a/2))$. Setting the bend radius R1 to $0.2(m+(a/2))$ or more, it becomes easier to prevent an occurrence of a crack in the outer core portion 32 being brought into contact with the outer circumferential face of the mold resin portion 21 covering the draw-out portions 2d. On the other hand, setting the bend radius R1 to $5.0(m+(a/2))$ or less, the effect of preventing an occurrence of a crack in the outer core portion 32 can be obtained, while preventing the outer circumferential shape of the mold resin portion 21 covering the draw-out portion 2d from greatly deviating from the outer circumferential shape of the wire 2w. It is more preferable that the bend radius R1 is $0.5(m+(a/2))$ or more and $2.0(m+(a/2))$ or less.

In addition to the outer circumferential face of the corner portion region 21a, in the present embodiment, as shown in FIG. 3, the outer circumferential face of the outer circumferential edge region 21o is also formed by a curved surface. In this manner, the corner portions of the mold resin portion 21 being brought into contact with the magnetic core 3 can be further reduced, and an occurrence of a crack in the magnetic core 3 originating from the corner portion can be further suppressed. The outer circumferential edge region 21o as used herein refers to the region located between respective extension faces of the end face of the coil 2 and the outer circumferential face of the coil 2, in the mold resin portion 21 covering the turn portion 2t of the wire 2w. The bend radius R2 of the outer circumferential face (the curved surface) of the outer circumferential edge region 21o may be equivalent to the bend radius of the mold releasing purpose curved surface described above. This is because the turn portion 2t is less subjected to the thermal expansion and contraction associated with the heat cycle as compared to the draw-out portion 2d. However, it is preferably greater than the bend radius of the mold releasing purpose curved surface. Specifically, it is preferable to set the bend radius R2 to greater than 0.5 mm, 0.7 mm or more, 1.0 mm or more, and further preferably 1.5 mm or more. The bend radius R2 may be equal to or greater than the bend radius R1 of the outer circumferential face of the corner portion region 21a. In particular, it is preferable that the bend radius R2 of the outer circumferential face of the outer circumferential edge region 21o also satisfies the following relationship, similarly to the bend radius R1 of the outer circumferential face of the corner portion region 21a described above: $0.2(m+(a/2)) \le R2 \le 5.0(m+(a/2))$. Herein, the outer circumferential face of the outer circumferential edge region 21o is a curved surface whose bend radius is greater than the mold releasing purpose curved surface.

The thickness of the mold resin portion 21 can be selected as appropriate, e.g., about 0.1 mm to 10 mm. As the thickness of the mold resin portion 21 is greater, insulation can be enhanced; as the thickness is smaller, the heat dissipating characteristic can be enhanced, and furthermore a reduction in size of the coil mold product can be achieved. When the thickness is to be reduced, the thickness is preferably about 0.1 mm to 3 mm. It should be selected as appropriate in the range in which desired insulation strength is satisfied. Further, it is preferable that the thickness is uniform over the entire covered portion. Herein, the thickness of the portion of the mold resin portion 21 covering the surface of the coil 2 is uniform. Accordingly, the outer shape of the coil mold product 20A excluding the corner portion region 21a and the outer circumferential edge region 21o is substantially similar to the coil 2. Note that, by the resin forming the mold resin portion 21 interposed between the coil 2 and the inner core portion 31, the coil 2 and the inner core portion 31 are disposed coaxially to each other.

As the insulating resin that forms the mold resin portion 21, what is preferably used is any resin that has the insulating characteristic with which the coil 2 and the magnetic core 3 can be fully insulated from each other, and the heat resistance with which the resin does not soften when the maximum temperature is reached during operation of the reactor 1A. Further, the resin should be capable of being subjected to transfer molding or injection molding. For example, thermosetting resin such as epoxy resin, silicone resin, and unsaturated polyester resin, or thermoplastic resin such as polyphenylene sulfide (PPS) resin and liquid crystal polymer (LCP) can be suitably used. When a mixture of the resin and a filler made of at least one type of ceramic selected from silicon nitride, alumina, aluminum nitride, boron nitride, and silicon carbide is used for the mold resin portion 21, insulation performance can be improved, and the heat dissipating characteristic can also be improved. In particular, when the resin whose thermal conductivity is 1 W/m·K or more, furthermore 2 W/m·K or more, is used for the mold resin portion 21, an excellent heat dissipating characteristic can be obtained and hence is preferable. Herein, for the mold resin portion 21, epoxy resin (thermal conductivity: 2 W/m·K) containing a filler is used.

The coil mold product 20A can be manufactured, for example, using the manufacturing method disclosed in Japanese Unexamined Patent Publication No. 2009-218293. The coil mold product 20A can be manufactured by a variety of molding methods such as injection molding, transfer molding, cast molding. More specifically, the coil mold product 20A can be manufactured by forming the mold resin portion 21 in the following manner: storing the coil 2 and the inner core portion 31 in a mold assembly, and performing molding having any appropriate support member disposed so as to be covered by resin of a desired thickness. At this time, a mold assembly should be prepared, with which the curved surface of a desired bend radius is formed at the outer circumferential face of the corner portion region 21a and at the outer circumferential face of the outer circumferential edge region 21o.

In manufacturing the coil mold product 20A, disposing an interval retaining member (not shown) for retaining the interval between the coil 2 and the inner core portion 31, it becomes easier to simplify the structure of the mold assembly. The interval retaining member may be, for example: a sleeve-like member (may be short, and such a sleeve-like shape may be formed by a combination of a plurality of divided pieces) disposed at the outer circumference of the inner core portion 31; an annular member having an L-shaped cross section and including the aforementioned sleeve-like member and one or more flat plate-like flange portions projecting outward from the periphery of the sleeve-like member; a plate member disposed between the coil 2 and the inner core portion 31; and a combination of the foregoing. Since the interval retaining member is integrated with the coil 2 and others by the resin forming the mold resin portion 21, when it is made of an insulating resin such as PPS resin, LCP, polytetrafluoroethylene (PTFE) resin described above, insulation between the coil 2 and the inner core portion 31 can be enhanced. When the sleeve-like member or the annular member described above is employed, the shape or thickness thereof is adjusted by partially reducing the thickness or providing cutting, such that the resin forming the mold resin portion 21 is fully packed between the coil 2 and the inner core portion 31.

<Magnetic Core>

As described above, the magnetic core 3 includes the columnar inner core portion 31 and the outer core portion 32 (FIG. 1(A)) disposed at at least one of the end faces 31e of the inner core portion 31 (herein the opposite end faces) and on the outer circumferential side of the coil 2. The outer core portion 32 substantially covers the outer circumferential face of the coil mold product 20A. The magnetic core 3 forms a closed magnetic path when the coil 2 is energized.

[Inner Core Portion]

Herein, since the inner core portion 31 is slightly longer than the length of the coil 2 in the axial direction, the opposite end faces 31e and the nearby outer circumferential face of the inner core portion 31 slightly project from the end faces of the coil 2 in the state where the inner core portion 31 is inserted and disposed in the coil 2. This state is maintained by the mold resin portion 21. The length of the inner core portion 31 projecting from each end face of the coil 2 (hereinafter, referred to as the projection length) can be selected as appropriate. Herein, though each projection length is equal, it may be different. Alternatively, the length of the inner core portion or the disposition position of the inner core portion relative to the coil can be adjusted such that the projecting portion is present at only one of the end faces of the coil 2. When the length of the inner core portion is equal to or greater than the length of the coil, the magnetic flux formed by the coil 2 can be allowed to fully pass through the inner core portion 31.

Though the magnetic core 3 may be made of a uniform material in its entirety, herein, the material of the magnetic core 3 is partially different. The inner core portion 31 is formed by a powder magnetic core, whereas the outer core portion 32 is formed by a composite material (resin containing mold product).

The powder magnetic core is representatively manufactured by molding raw material powder under pressure, and thereafter performing thermal treatment as appropriate. Even when the powder magnetic core is in a complicated three-dimensional shape, it can be molded relatively easily.

The raw material powder may include coated powder in which the surface of metal particles made of an iron base material (iron group metal or iron alloy) or a soft magnetic material such as rare-earth metal is provided with an insulating coat made of silicone resin or phosphate, ferrite powder, or mixed powder in which resin such as thermoplastic resin or an additive such as higher fatty acid (representatively, the additive that vanishes or changes into an insulating substance by thermal treatment) is mixed as appropriate. By the foregoing manufacturing method, a powder magnetic core in which an insulating substance is interposed among the soft magnetic particles can be obtained. Since the powder magnetic core exhibits excellent insulation performance, the eddy current loss can be reduced. Further, the powder magnetic core can increase the saturation magnetic flux density than the composite material forming the outer core portion 32 does, when the raw material or the manufacturing condition is adjusted by the soft magnetic powder of the raw material or the molding pressure being increased. As the powder magnetic core, a known powder magnetic core can be employed.

The columnar inner core portion 31 may be an integrated element that is molded using a mold assembly of a desired shape, or a lamination product in which a plurality of core pieces each made of the powder magnetic core are laminated. The lamination products can be fixed by an adhesive agent or an adhesive tape to be an integrated element. Herein, the inner core portion 31 is a solid element in which no gap member or air gap is interposed.

[Outer Core Portion]

Herein, the outer core portion 32 is in a shape conforming to the space formed by the inner circumferential face of the case 4A and the outer circumferential face of the coil mold product 20A stored in the case 4A. Accordingly, the coil mold product 20A is covered by the outer core portion 32 except for the installation face being brought into contact with the case 4A, the opposite end portions of the wire 2w, and part of the mold resin portion 21 covering the draw-out portions 2d. That is, these regions are exposed outside the outer core portion 32. Since part of the outer core portion 32 is provided so as to be coupled to the opposite end faces 31e of the inner core portion 31, the magnetic core 3 forms a closed magnetic path.

The composite material (the resin containing mold product) forming the outer core portion 32 can be representatively manufactured by injection molding, transfer molding, MIM (Metal Injection Molding), cast molding and the like. In the injection molding, a prescribed pressure is applied to a mixture containing magnetic substance powder and resin while the mixture is packed into a mold assembly, and thus the mixture is molded. Thereafter, the resin is cured, whereby the composite material is obtained. In the transfer molding and the MIM also, molding is performed by packing a raw material into a mold assembly. In the cast molding, the mixture is poured into a mold assembly or the case 4A without application of a pressure. Then, the mixture is molded and cured, whereby the composite material is obtained.

When the raw material is directly packed into the case 4A using the case 4A as a mold assembly to form the composite material, the following advantages are obtained: (1) the outer core portion 32 having a shape conforming to the coil mold product 20A can be easily molded even when the coil mold product 20A has a complicated shape; and (2) the case 4A and the composite material can be easily closely attached to each other. Particularly, when the inner face of the case 4A is also subjected to the surface roughening treatment, the contact area between the case 4A and the outer core portion 32 can be increased, whereby the heat dissipating characteristic can be enhanced.

The magnetic substance powder in the composite material forming the outer core portion 32 may be of the same composition as the soft magnetic powder forming the inner core portion 31 described above, or may be of different composition. In the situation where they are identical in composition also, since the composite material contains resin being a non-magnetic material, it is lower in saturation magnetic flux density and in relative permeability than the powder magnetic core. Accordingly, forming the outer core portion 32 by the composite material, it becomes possible to set the outer core portion 32 to be lower in relative permeability than the inner core portion 31 made of the powder magnetic core.

The magnetic substance powder in the composite material may be made of a single type of powder or a plurality of types of powder differing in material. The composite material forming the outer core portion 32 is preferably iron base powder such as pure iron powder. Further, when the composite material is coated powder similarly to the powder magnetic core, insulation among soft magnetic particles can be enhanced, whereby the eddy current loss can be reduced.

The average particle size of the magnetic substance powder in the composite material may be 1 μm or greater and 1000 μm or less, particularly 10 μm or more and 500 μm or less. Further, when the magnetic substance powder includes a plurality of types of powder differing in particle size (coarse powder and fine powder), a reactor with high saturation magnetic flux density and low loss can be easily obtained. Note that, the magnetic substance powder in the composite material is substantially identical to the powder of the raw material (maintained). Using the powder whose average particle size falls within the range noted above as the raw material, excellent flowability is exhibited. Thus, by injection molding or the like, a composite material can be manufactured highly productively.

The content of the magnetic substance powder in the composite material forming the outer core portion 32 may be 40 volume percent or more and 75 volume percent or less in terms of volume proportion, when the composite material is 100 percent. Since the magnetic substance powder is 40 volume percent or more, the proportion of the magnetic component is fully high, whereby the magnetic characteristic such as the saturation magnetic flux density of the whole magnetic core 3 can be enhanced easier. When the magnetic substance powder is 75 volume percent or less, excellent manufacturability of the composite material is achieved.

The resin serving as the binder in the composite material may be representatively thermosetting resin such as epoxy resin, phenolic resin, silicone resin, and urethane resin. Other example may include thermoplastic resin such as PPS resin, polyimide resin, fluororesin, and polyamide resin, room temperature curing resin, and low temperature curing resin.

It is also possible to employ a composite material containing, in addition to the magnetic substance powder and the resin, powder (filler) made of a non-magnetic substance such as ceramic, e.g., alumina or silica. The filler contributes toward improving the heat dissipating characteristic, and suppressing uneven distribution of the magnetic substance powder (uniform dispersion). Further, when the filler is in a form of fine particles, since the filler is interposed among the magnetic substance particles, a reduction in the proportion of the magnetic substance powder attributed to the contained filler can be suppressed. When the composite material is 100 mass percent, the content of the filler should be 0.2 mass percent or more and 20 mass percent or less, furthermore 0.3 mass percent or more and 15 mass percent or less, particularly 0.5 mass percent or more and 10 mass percent or less. Thus, the effects described above can be fully obtained.

Herein, the outer core portion 32 is formed by the composite material made up of coated powder, in which particles of iron base material (pure iron) whose average particle size is 75 μm or less are provided with an insulating coat on their surface, and epoxy resin (the content of pure iron powder in the composite material is 40 volume percent). Further, similarly to the inner core portion 31, no gap member or air gap is interposed in the outer core portion 32 also. Accordingly, the magnetic core 3 is entirely free of gap. Since no gap is included, the following advantages are obtained: (1) a reduction in size; (2) a reduction in loss; and (3) suppression of a reduction in inductance when being energized with great current. Note that, in the magnetic core 3, gap members made of a non-magnetic material, e.g., alumina plates, or air gaps may be interposed.

The shape of the outer core portion 32 is not particularly limited so long as a closed magnetic path can be formed. As in the present embodiment, when substantially the entire circumference of the coil mold product 20A is covered by a composite material, the composite material (the outer core portion 32) can strengthen the protection of the coil mold product 20A from the external environment or mechanical protection thereof.

Further, the coil mold product 20A may be partially exposed outside the composite material (the outer core portion 32). For example, at least part of the mold resin portion 21 covering the draw-out portions 2d of the coil 2 (the coil mold product 20A) may be exposed outside the composite material. Then, contact between the end portions of the wire 2w and the outer core portion 32 can be avoided, whereby insulation between them can be secured. Further, at the outer circumferential face of the turn portion 2t of the coil 2, the region disposed on the opening side of the case 4A may be exposed outside the composite material. In this situation, the heat dissipating characteristic is expected to be enhanced. Further, when the region in the coil mold product 20A disposed on the opening side of the case 4A is exposed outside the outer core portion 32, a sealing resin may be packed from the opening side of the case 4A, to seal the combined product made up of the coil 2 and the magnetic core 3 with the sealing resin. Thus, the coil mold product 20A and the outer core portion 32 can be covered by the sealing resin, whereby such members can be protected from the external environment or mechanically protected. In this situation, part of the outer circumference of the mold resin portion 21 covering the draw-out portions 2d of the coil 2 may be covered by a sealing resin (a resin containing mold product). As the sealing resin, for example, epoxy resin, urethane resin, silicone resin, unsaturated polyester resin, PPS resin, or the like can be preferably used. The sealing resin may be mixed with a filler made of a non-magnetic substance such as ceramic, e.g., alumina and silica, from the viewpoint of improving the heat dissipating characteristic.

[Magnetic Characteristic]

As described above, since the magnetic core 3 is made of different materials, the magnetic core 3 is partially different in the magnetic characteristic. Specifically, the inner core portion 31 is higher in saturation magnetic flux density than the outer core portion 32, and the outer core portion 32 is lower in relative permeability than the inner core portion 31. More specifically, the inner core portion 31 made of the powder magnetic core has a saturation magnetic flux density of 1.6 T or more, and that is 1.2 times or more as great as the saturation magnetic flux density of the outer core portion 32. The relative permeability of the inner core portion 31 is 100 or more and 500 or less. The outer core portion 32 made of the composite material has a saturation magnetic flux density of 0.6 T or more, and that is less than the saturation magnetic flux density of the inner core portion 31. The relative permeability of the outer core portion 32 is 5 or more and 50 or less, preferably 10 or more and 35 or less. The relative permeability of the entire magnetic core 3 made up of the inner core portion 31 and the outer core portion 32 is 10 or more and 100 or less. In the mode in which the saturation magnetic flux density of the inner core portion is high, when it is intended to obtain the magnetic flux identical to that of the magnetic core as a whole having uniform saturation magnetic flux density, the cross-sectional area of the inner core portion can be reduced. Therefore, this mode contributes toward reducing the size of the reactor. The saturation magnetic flux density of the inner core portion 31 is 1.8 T or more, and further preferably 2 T or more. It is preferable that the saturation magnetic flux density of the inner core portion 31 is 1.5 times, more preferably 1.8 or more, as great as the saturation magnetic flux density of the outer core portion 32. Using a lamination product of electromagnetic steel sheets represented by silicon steel plates in place of the powder magnetic core, the saturation magnetic flux density of the inner core portion can be increased further easier. On the other hand, when the relative permeability of the outer core portion 32 is set to be lower than that of the inner core portion 31, the magnetic saturation can be suppressed. Accordingly, for example, the magnetic core 3 of a gapless structure can be obtained. With the magnetic core 3 of a gapless structure, a leakage flux can be reduced.

[Case]

Herein, the case 4A storing the assembled product made up of the coil mold product 20A and the outer core portion 32 (the magnetic core 3) is a container in which a plate-like bottom portion 40 and a frame-like wall portion 41 provided to stand from the bottom portion 40 are integrally molded, and the side opposite to the bottom portion 40 is opened. The outer bottom face of the bottom portion 40 is formed by a flat surface, and when the reactor 1A is installed on the installation target such as a cooling base, at least part of (herein, the entire) the outer bottom face becomes a cooled face that is cooled by being brought into contact with the installation target. Note that, the outer bottom face is allowed to partially include a region that is not brought into contact with the installation target (a flat surface or a curved surface). Further, though FIG. 1 shows the mode in which the outer bottom face is disposed on the bottom side, it may be disposed on the side or on the top side.

Herein, in connection with the shape of the case 4A, though the bottom portion 40 is formed by a quadrangular plate, and the wall portion 41 is quadrangular frame-shaped, such geometry can be selected as appropriate in accordance with the shape of the stored item or the like. The size of the case 4A can also be selected as appropriate in accordance with the stored item in the case 4A.

The case 4A protects the stored item from the external environment (dust or corrosion) and provides mechanical protection. Further, in order for the case 4A to be used as a heat dissipation path, the material of the case 4A is preferably a material being excellent in thermal conductivity, particularly, a material being higher in thermal conductivity than the magnetic substance powder forming the magnetic core 3. Further, when the case is made of a material being non-magnetic but conductive material, a leakage flux toward the outside of the case can be prevented. Accordingly, as the material forming the case 4A, a non-magnetic metal material can be used. For example, aluminum, aluminum alloy, magnesium, and magnesium alloy may be used. Since the non-magnetic metals noted herein are lightweight, they are suitable as a material of an in-vehicle component which is desired to be lightweight. Since the case 4A is made of metal, the case 4A in a desired shape can be easily manufactured by casting, cutting work, plastic work and the like. Herein, the case 4A is made of aluminum alloy. In place of a metal material such as aluminum, the case 4A may be formed by a resin material. When the case is formed by a resin material, for example, polybutylene terephthalate (PBT) resin, urethane resin, PPS resin, acrylonitrile butadiene styrene (ABS) resin or the like can be used. In this situation, for the purpose of enhancing the heat dissipating characteristic, a filler made of a non-magnetic substance such as ceramic, e.g., alumina or silica, may be mixed. By forming the case by a resin material, the case being lightweight can be manufactured at low costs.

In the situation where the composite material forming the outer core portion 32 is molded by cast molding using the case 4A as a mold assembly, by employing the mode in which minor concave and convex are provided to at least part of the inner face of the case 4A, by preferably 50 area percent or more, further preferably 80 area percent or more, adhesion between the composite material and the case 4A can be enhanced, and the heat dissipating characteristic can be improved. In forming the minor concave and convex, the surface roughening treatment can be used.

The surface roughening treatment may include, for example, a process of providing minor concave and convex whose maximum height is 1 mm or less, preferably 0.5 mm or less. Specifically, known schemes for enhancing adhesion between metal and resin can be employed, such as: (1) anodic oxidation treatment represented by aluminum anodizing; (2) acicular plating by any known scheme; (3) implanting a molecular junction compound by any known scheme; (4) fine groove work by laser; (5) nano-order dimple formation using any known special solution; (6) etching process; (7) sand blasting or shot blasting; (8) filing; (9) delustering treatment by sodium hydroxide; and (10) abrasion by a wire brush. An increase in the surface area by such surface roughening is expected to also improve the heat dissipating characteristic.

Further, an increase in the surface area achieved by forming any groove or hole by subjecting a general metal to cutting work or by shaping the surface into a concave-convex shape by casting, plastic work or the like is also expected to provide an improvement in adhesion or the heat dissipating characteristic derived by an increase in the contact area between the case 4A and the resin forming the outer core portion 32.

The case 4A further includes attaching portions 400 for fixing the reactor 1A to the installation target. The attaching portions 400 are projecting pieces that project from the periphery of the bottom portion 40 toward the outside of the wall portion 41. The projecting pieces are each provided with a bolt hole into which a fastening member (not shown) such as a bolt is inserted. Herein, in the quadrangular case 4A, the corner portions are respectively provided with the attaching portions 400. Since the attaching portions 400 are provided, the reactor 1A can be fixed to the installation target with ease. The attaching position, the number of pieces, the shape and the like of the attaching portions 400 can be selected as appropriate. The attaching portions 400 can be dispensed with.

Further, the case 4A may include a lid portion (not shown) so as to cover the opening portion of the case 4A. Provision of the lid portion makes it possible to prevent the stored item in the case 4A from coming off and to protect the stored item. Furthermore, when the lid portion is made of a material being non-magnetic but conductive similarly to the material of the case 4A, an occurrence of a leakage flux can be prevented. Further, when the lid portion is made of a material with excellent thermal conductivity such as a metal material similarly to the case 4A, an improvement in the heat dissipating characteristic can also be expected.

In the mode in which the lid portion is provided, the lid portion may be a plate member in the shape corresponding to the opening portion of the case 4A. The lid portion should be provided with wire holes into which the opposite end portions of the wire 2w are inserted. Further, it is preferable that the case 4A includes lid pedestals with which bolt fixing the lid portion are screwed, the lid pedestals being integrated with the wall portion. In this situation, the lid portion may include projecting pieces provided with bolt holes into which bolts are inserted. For example, the lid pedestals should be respectively provided at four faces forming the wall portion, and the projecting pieces of the lid portion should be provided at the positions corresponding to the lid pedestals when the lid portion is disposed on the case. The formation places and the number of pieces of the lid pedestals and the projecting pieces can be selected as appropriate.

<Uses>

The reactor 1A structured as described above can be suitably used where the energizing conditions are, for example, the maximum current (direct current) is about 100 A to 1000 A; the average voltage is about 100 V to 1000 V; and the working frequency is about 5 kHz to 100 kHz. Representatively, the reactor 1A can be suitably used as a constituent component of an in-vehicle power converter apparatus of an electric vehicle, a hybrid vehicle and the like.

<<Method for Manufacturing Reactor>>

The reactor 1A can be manufactured as follows, for example. Herein, firstly, the coil 2 and the inner core portion 31 are separately prepared, which are then integrally molded by the mold resin portion 21, to obtain the coil mold product 20A (FIG. 1(B)).

Next, when the outer core portion 32 is manufactured by cast molding using the case 4A as a mold assembly, the coil mold product 20A is stored in the case 4A. An adhesive agent or grease may be applied as appropriate to the inner bottom face of the case 4A. When grease or the like is interposed between the coil mold product 20A and the case 4A, air is hardly interposed between them and they can be closely attached to each other, whereby the heat dissipating characteristic can be enhanced. Then, a mixture is fabricated from the magnetic substance powder and resin being the raw material of the outer core portion 32, and binder or non-magnetic substance powder as appropriate. Then, the mixture is packed into the case 4A serving as a mold assembly, and thereafter the resin is cured. From the foregoing procedure, a reactor with no lid portion can be obtained.

[Operation and Effect]

With the reactor 1A described above, the following effects are achieved.

In connection with the reactor 1A according to the first embodiment, the bend radius R1 of the outer circumferential face of the corner portion region 21a in the mold resin portion 21 is greater than 0.5 mm. Further, the outer circumferential face is a curved surface whose bend radius is greater than that of the mold releasing purpose curved surface. Therefore, in the outer core portion 32 formed by the composite material containing magnetic substance powder and resin, the portion being in contact with the outer circumferential face of the corner portion region 21a will not easily become the origin of a crack. Accordingly, it becomes possible to suppress an occurrence of a crack in the outer core portion 32 attributed to the thermal expansion and contraction of the coil 2 associated with the heat cycle or vibrations invited by the coil 2 being supplied with alternating current and excited. Thus, the reactor whose outer core portion 32 is not easily damaged can be obtained. Further, in the mode employing a sealing resin to seal, even when the outer circumferential face of the corner portion region 21a in the mold resin portion 21 is covered by the sealing resin, the portion being brought into contact with the outer circumferential face of the corner portion region 21a in the sealing resin will not easily become the origin of a crack. Accordingly, the sealing resin is not easily damaged by the heat cycle or vibrations.

In the mold resin portion 21, the outer circumferential face of the outer circumferential edge region 21o is also a curved surface whose bend radius is greater than that of the mold releasing purpose curved surface. Therefore, corner portions each tends to become the origin of a crack in the mold resin portion 21 being brought into contact with the outer core portion 32 or the sealing resin can be further reduced. Accordingly, it is further effective in suppressing the outer core portion 32 and the sealing resin from being damaged.

Since the reactor 1A is in the horizontal disposition mode as described above, there are many regions in which the distance from the outer circumferential face of the coil 2 to the installation target is short. Further, the heat of the coil 2 can be easily transferred to the case 4A, and to the installation target. Accordingly, the reactor 1A has an excellent heat dissipating characteristic.

Since the reactor 1A includes the coil mold product 20A as a constituent component, the coil 2 can be handled with ease. Further, the number of assembled components is small, and excellent assemblability is also achieved. In particular, with the reactor 1A, since the coil mold product 20A integrally retains part of the magnetic core 3 (the inner core portion 31) also, a further excellent assemblability is exhibited.

In addition, since at least part of (herein the outer core portion 32) the magnetic core 3 is the composite material described above, the following effects are attained.

(1) The outer core portion 32 can be formed with ease even in a complicated shape, i.e., covering the coil mold product 20A in which the coil 2 and the inner core portion 31 are integrated.

(2) When cast molding is employed in which the case 4A is used as a mold assembly, since the magnetic core 3 can be formed simultaneously with the outer core portion 32, the number of manufacturing steps is smaller. Thus, excellent productivity is exhibited.

(3) The inner core portion 31 and the outer core portion 32 can be joined to each other by the resin forming the outer core portion 32. Further, the coil mold product 20A and the case 4A can be joined to each other by the resin forming the outer core portion 32.

(4) The magnetic characteristic of the outer core portion 32 can be changed easily.

(5) Since the material covering the outer circumference of the coil mold product 20A (the coil 2) contains the magnetic substance powder, as compared to the situation where the material is solely resin, the thermal conductivity is higher and an excellent heat dissipating characteristic is obtained.

(6) Since the material forming the outer core portion 32 contains the resin, the protection from the external environment and the mechanical protection of the coil mold product 20A can be achieved.

Second Embodiment

Figure 4:
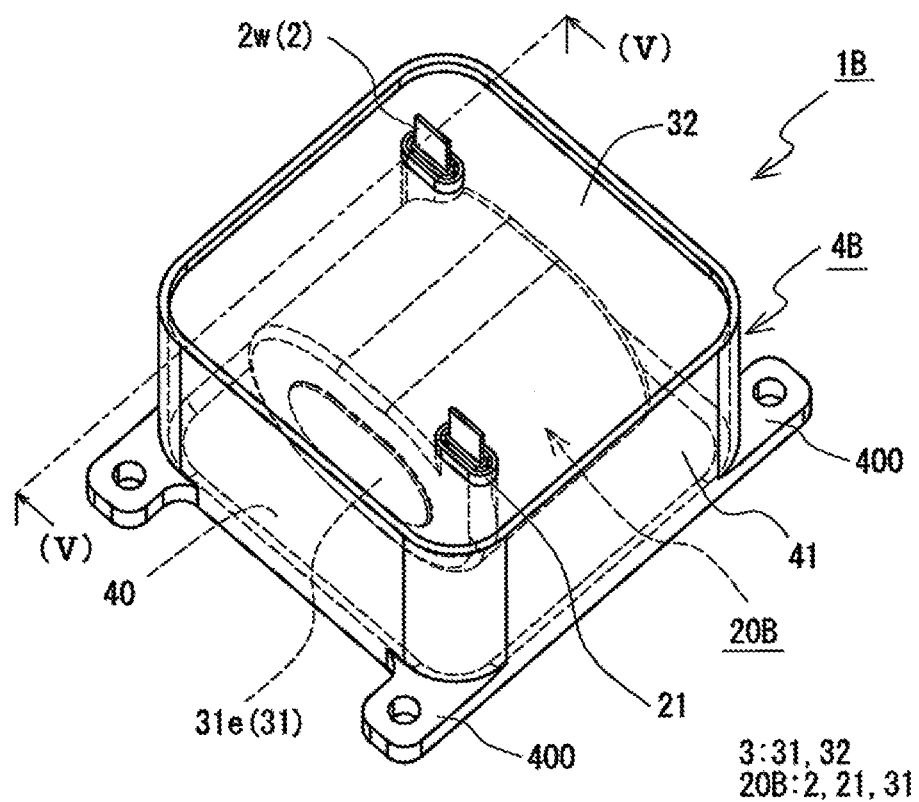
FIG. 4 is a schematic perspective view showing a reactor according to a second embodiment.
Figure 5:
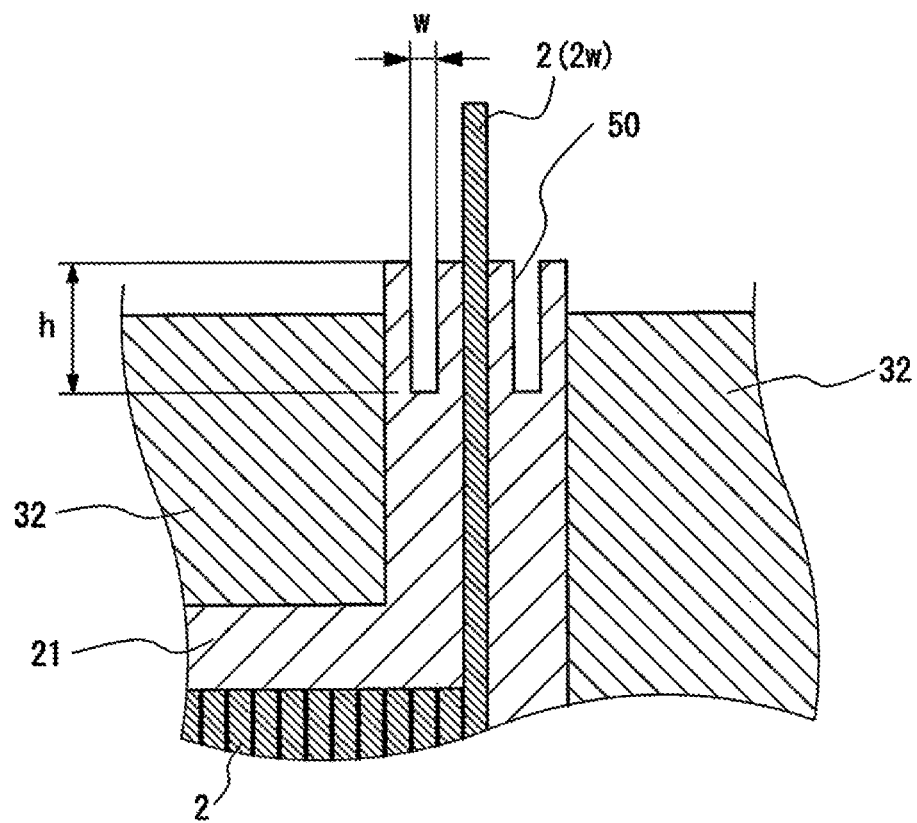
FIG. 5 is a partial cross-sectional view showing part of the cross section taken along line V-V in the reactor shown in FIG. 4.
Figure 6:
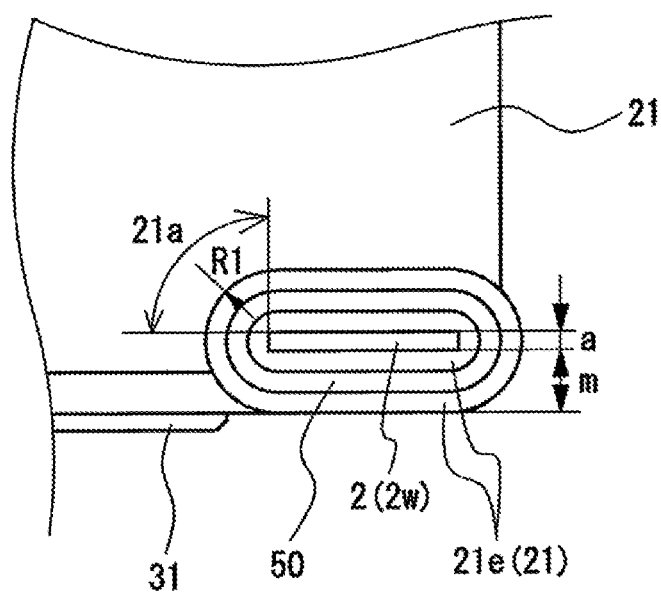
FIG. 6 is a top view showing the area near the draw-out portion of the wire in the coil mold product shown in FIG. 4.

With reference to FIGS. 4 to 6, a description will be given of a reactor 1B according to a second embodiment. As shown in FIG. 4, the basic structure of the reactor 1B according to the second embodiment is similar to that of the reactor 1A according to the first embodiment. That is, a bottomed sleeve-like case 4B stores a coil mold product 20B in which a coil 2 having a turn portion and draw-out portions and an inner core portion 31 are integrally retained by a mold resin portion 21, and an outer core portion 32. The outer circumferential side of the coil mold product 20B is covered by the outer core portion 32 made of a composite material (a resin containing mold product) containing magnetic substance powder and resin. The main difference of the reactor 1B according to the second embodiment from the first embodiment lies in including a groove 50 that surrounds a wire 2w at each end face 21e (FIG. 6) of the mold resin portion 21 covering part of the outer circumference of the draw-out portions of the coil 2. In the following, a description will be given focusing on the differences, and the structures and effects similar to those of the first embodiment will not be described.

[Mold Resin Portion]

The groove 50 surrounds the outer circumference of the wire 2w at each end face 21e of the mold resin portion 21. Thus, the creepage distance between the end portion of the wire 2w and the outer core portion 32 (the magnetic core 3) is increased, whereby insulation between each end portion of the wire 2w and the outer core portion 32 is increased.

The shape of the groove 50 can be selected as appropriate. For example, it is preferable to employ the shape that conforms to the outer circumferential face of the mold resin portion 21 covering each draw-out portion 2d. Thus, the creepage distance can be constant over the circumferential direction of the wire 2w, and hence insulation can be uniform over the outer circumference of the wire 2w. Herein, the groove 50 has a racetrack shape that conforms to the outer circumferential face of the mold resin portion 21 covering the draw-out portion 2d.

The depth h of the groove 50 (FIG. 5) or the width w of the groove 50 may be selected as appropriate, within the range contributing to enhancing insulation. As the depth h of the groove 50 is deeper, the creepage distance can be longer. Accordingly, insulation between each end portion of the wire 2w and the outer core portion 32 can be secured with ease. Further, as the width w of the groove 50 is wider, the creepage distance can be longer. In addition, a space is formed in the mold resin portion 21 covering the draw-out portion by the volume of the groove 50. That is, when the depth h of the groove 50 is deep, vibrations at each end portion of the wire 2w mainly occur only in the space, and do not easily propagate to the outer circumferential face of the mold resin portion 21 covering the draw-out portions located outside the space. Therefore, vibrations are not easily transferred to the area near the outer circumferential face being in contact with the outer core portion 32 of the mold resin portion 21, and hence the effect of vibration absorption can also be expected. Accordingly, it becomes possible to further prevent an occurrence of a crack in the outer core portion 32. As the depth h of the groove 50 is deeper and as the width w of the groove 50 is wider, the effect is greater. The depth h of the groove 50 may be specifically 0.1 mm or more and 20 mm or less. The width w of the groove 50 may be specifically 0.1 mm or more and 2 mm or less. Here, the depth h and width w of the groove 50 are uniform over the entire outer circumference of the wire 2*w*.

The groove 50 may be a single groove extending along the outer circumference of the wire 2*w* forming a single circle. Alternatively, the groove 50 may be multiple grooves extending along the outer circumference wire 2*w* forming a plurality of circles in the radial direction about the wire 2*w*. As the number is greater, the creepage distance can be increased, and insulation can be enhanced.

In forming the groove 50, for example, a mold assembly that is divided into the side toward which the end portions of the wire 2*w* are drawn out and the side opposite thereto is used as a mold assembly for molding the mold resin portion 21. Inside the mold assembly, annular projecting portions respectively covering the end portions of the wire 2*w* that can achieve desired dimension, i.e., the depth h of the groove 50 and the width w of the groove 50, should be provided. Thus, the groove 50 can be formed.

With the reactor 1B, in addition to the effects similar to those of the first embodiment, insulation can be enhanced because the creepage distance between the outer core portion 32 and each end portion of the wire 2*w* can be increased, thanks to provision of the groove 50 surrounding the outer circumference of the wire 2*w* at each end face 21*e* of the mold resin portion 21.

Third Embodiment

In connection with the reactor according to each of the first and second embodiments, the description has been given of the coil mold products 20A and 20B each integrally including also the inner core portion 31. In connection with a reactor according to a third embodiment, as shown in FIG. 7, a description will be given of a coil mold product 20C with no inner core portion, that is, a coil mold product 20C in which a coil 2 is retained by a mold resin portion 21 and a hollow hole into which an inner core portion is inserted and disposed is included.

In this situation, in the mold resin portion 21, it is preferable that the outer circumferential face of an inner circumferential edge region 21*i* covering the inner circumferential edge of the coil 2 is also formed by a curved surface. In the situation where the coil mold product 20C does not integrally include the inner core portion 31, when the mold resin portion 21 is placed to cover conforming to the shape of the coil 2, corner portions may be formed at the outer circumferential face of the inner circumferential edge region 21*i* covering the inner circumferential edge of the coil 2. Such a corner portion may possibly become the origin of a crack. Accordingly, by forming the outer circumferential face of the inner circumferential edge region 21*i* also by a curved surface, the origin of a crack can be further reduced. Thus, the outer core portion 32 is further unlikely to be damaged. As used herein, the inner circumferential edge region 21*i* refers to the mold resin portion 21 located between respective extension faces of the end face and the inner circumferential face of the coil 2, in the mold resin portion 21 covering each turn portion 2*t* of the wire 2*w*.

Though the bend radius R3 of the outer circumferential face (the curved surface) of the inner circumferential edge region 21*i* may be equivalent to the bend radius of the mold releasing purpose curved surface, it is preferably greater than the bend radius of the mold releasing purpose curved surface. Specifically, the bend radius R3 is preferably greater than 0.5 mm, 0.7 mm or more, 1.0 mm or more, and further preferably 1.5 mm or more. It may be equal to or greater than the bend radius R1 of the outer circumferential face of the corner portion region 21*a*. In particular, the bend radius R3 of the outer circumferential face of the inner circumferential edge region 21*i* preferably satisfies the relationship $0.2(m+(a/2)) \leq R3 \leq 5.0(m+(a/2))$, similarly to the bend radius R1 of the outer circumferential face of the corner portion region 21*a* described above. Herein, the outer circumferential face of the inner circumferential edge region 21*i* is a curved surface whose bend radius is greater than that of the mold releasing purpose curved surface.

In manufacturing the coil mold product 20C, a core should be used in place of the inner core portion 31 described above. Further, forming the hollow hole by adjusting the thickness of the resin provided inside the coil 2, the resin can be used for positioning the inner core portion 31. In order to manufacture a reactor including the coil mold product 20C, a coupling member should be formed by inserting the inner core portion into the hollow hole of the coil mold product 20C. Then, the coupling member should be stored in the case, and the outer core portion should be formed between the coupling member and the case.

Fourth Embodiment

In the first to third embodiments, while the description has been given of the horizontal storage mode, it is possible to employ the vertical storage mode (see FIG. 8) in which the coil is stored in the case such that the axis of the coil becomes perpendicular to the outer bottom face formed by a flat surface in the case. With the vertical disposition mode, the contact area relative to the installation target can be easily reduced, and a reduction in size of the installation area can be achieved. In the vertical disposition mode, for example, one end face of the inner core portion is caused to project from one end face of the coil to be brought into contact with the inner bottom face of the case. This forms the magnetic core in which the outer circumferential face of the inner core portion on the one end face projecting from the coil and the other end face of the inner core portion are in contact with the composite material of the outer core portion.

Figure 8:
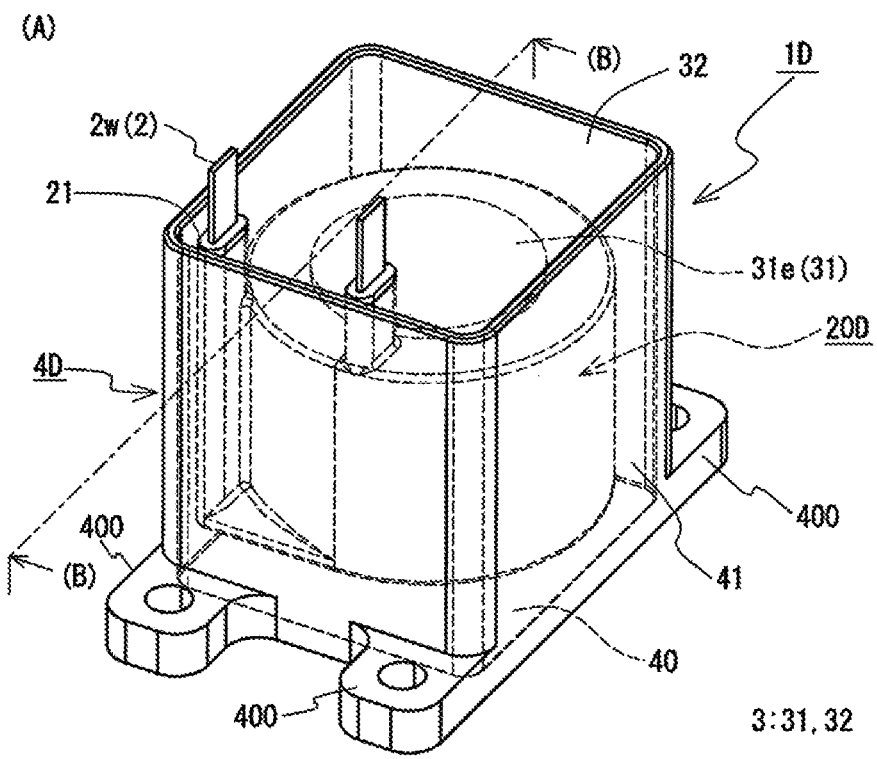
FIG. 8(A) is a schematic perspective view showing a reactor according to a fourth embodiment.
FIG. 8(B) is a schematic cross-sectional view of the reactor taken along line B-B.
Figure 8:
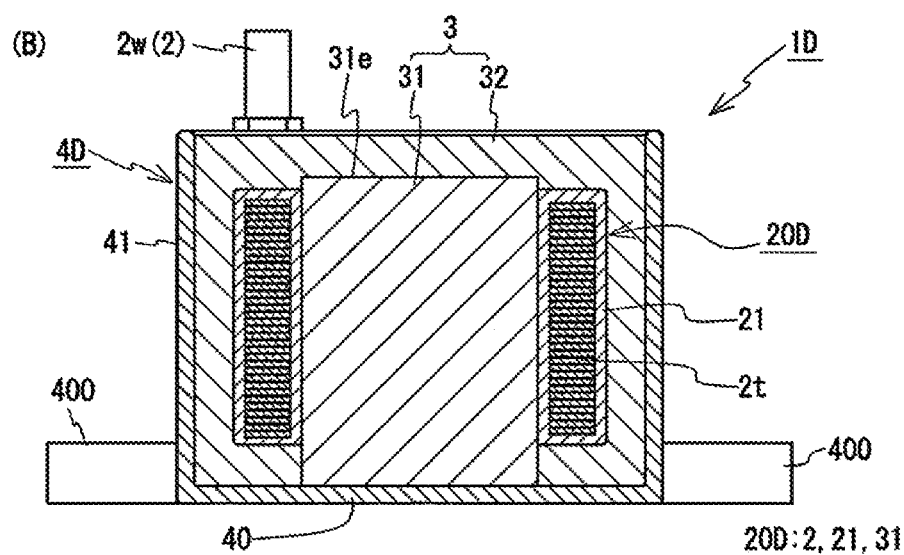

A reactor 1D according to a fourth embodiment shown in FIG. 8 is different from the reactor 1A according to the first embodiment in the storage mode of the coil 2, i.e., being the vertical storage mode described above, and the basic structure is the same. That is, a coil mold product 20D (see FIG. 9) in which a coil 2 having a turn portion 2*t* and draw-out portions 2*d* and an inner core portion 31 are integrally retained by a mold resin portion 21 and an outer core portion 32 are stored in a bottomed sleeve-like case 4D (see FIG. 8(A)). The outer circumferential side of the coil mold product 20D is covered by the outer core portion 32 formed by a composite material (a resin containing mold product) containing magnetic substance powder and resin. In the following, a description will be given focusing on the difference.

[Coil Mold Product]

Figure 9:
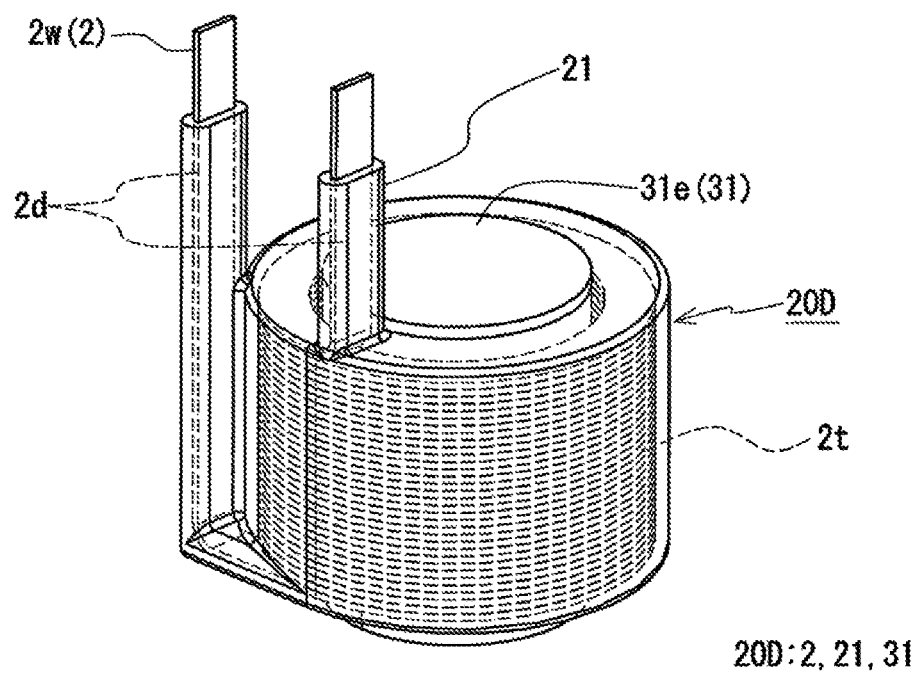
FIG. 9 is a schematic perspective view showing a coil mold product included in the reactor according to the fourth embodiment.

In the present embodiment, as shown in FIG. 9, the draw-out direction of the draw-out portions 2*d* of the wire 2w in the coil 2 is different from that in the coil 2 described in the section of the first embodiment. Specifically, on one end side of the coil 2, the region on one end portion side of the wire 2w is drawn out in the axial direction of the coil 2. The region on the other end portion side of the wire 2w is folded back toward the one end side of the coil 2, and similarly drawn out in the axial direction. That is, the opposite end portions of the wire 2w are drawn out from the one end side of the coil 2 (the top side in FIGS. 8 and 9) in parallel to the axial direction of the coil 2. Further, the end face shape of the coil 2 is circular.

[Inner Core Portion and Outer Core Portion]

The inner core portion 31 is columnar conforming to the inner circumferential shape of the coil 2. Further, in the state where the inner core portion 31 is inserted and disposed inside the coil 2, part of the inner core portion 31 projects from the end face on the other end side (the bottom side in FIGS. 8 and 9) of the coil 2. When the coil mold product 20D is stored in the case 4D, the projecting end face is disposed so as to be in contact with the case 4D (the bottom portion 40) (see FIG. 8(B)). On the other hand, the outer core portion 32 is provided to couple the end face 31e on one end side of the inner core portion 31 and the outer circumferential face of the projecting portion on the other end side to each other, such that a closed magnetic path is formed.

In the present embodiment, though the description has been given of the coil mold product 20D that integrally includes the inner core portion 31 also, it is possible to employ the coil mold product with no inner core portion, similarly to the coil mold product 20C described in the section of the third embodiment. Further, similarly to the coil mold product 20B described in the section of the second embodiment, a groove that surrounds the wire 2w may be formed at each end face of the mold resin portion 21 covering the draw-out portions 2d of the coil 2.

Fifth Embodiment

In the first to fourth embodiments, the description has been given of the modes in which the inner core portion 31 is formed by the powder magnetic core, and solely the outer core portion 32 is formed by the composite material. In other possible mode, the inner core portion may also be formed by the composite material containing magnetic substance powder and resin. That is, the magnetic core may be entirely formed by the composite material. In this situation, both the inner core portion and the outer core portion can be made of an identical composite material. In this situation, the content of the magnetic substance powder of the composite material forming the core portions may be 40 volume percent or more and 75 volume percent or less; the saturation magnetic flux density may be 0.6 T or more, preferably 1.0 T or more; the relative permeability may be 5 or more and 50 or less, preferably 10 or more and 35 or less; and the relative permeability of the entire magnetic core may be 5 or more and 50 or less. Further, in this situation, the inner core portion and the outer core portion may be integrally molded using the case as a mold assembly. For example, similarly to the coil mold product 20C described in the section of the third embodiment, a coil mold product having a hollow hole in which an inner core portion is disposed is prepared. Further, the coil mold product is stored at a prescribed position in the case. Then, the raw material of the composite material is packed into the case. Then, the raw material is poured into the hollow hole of the coil mold product and the space between the coil mold product and the case. Then, the resin is cured. By carrying out molding using the case as a mold assembly in this manner, a magnetic core formed by the composite material in which the inner core portion and the outer core portion are integrated can be obtained. Further, in this mode described above, the inner core portion and the outer core portion may be mold products of the composite material, which are separately molded into prescribed shapes using mold assemblies, respectively. For example, an inner core portion formed by the composite material (the mold product) molded using a mold assembly is prepared. Then, the inner core portion is disposed in a coil, to obtain an integrated coil mold product. Then, this coil mold product is stored at a prescribed position in the case, and the raw material of the composite material is packed into the case, to mold an outer core portion made of the composite material using the case as a mold assembly. Alternatively, as will be described later, it is also possible to form the magnetic core by separately fabricating an outer core portion formed by the composite material (the mold product) molded using a mold assembly, and combining with an inner core portion, such that a closed magnetic path is formed. Then, forming the inner core portion and the outer core portion from an identical composite material, the core portions can be made of the identical composite material even when the core portions are separately formed.

Further, the inner core portion and the outer core portion can be made of different composite materials. With this structure, for example, when the core portions are made of identical magnetic substance powder, the saturation magnetic flux density or the relative permeability can be adjusted by changing the content of the magnetic substance powder, and the composite material of a desired characteristic can be advantageously obtained with ease. In a specific mode, the inner core portion and the outer core portion are respectively formed by composite materials differing in the material or content of the magnetic substance powder, and the saturation magnetic flux density of the inner core portion is high and the relative permeability of the outer core portion is low as in the first to fourth embodiments, or conversely, the relative permeability of the inner core portion is low and the saturation magnetic flux density of the outer core portion is high. By increasing the blending amount of the magnetic substance powder in the composite material, the composite material with high saturation magnetic flux density and high relative permeability can be obtained easily. By reducing the blending amount, the composite material with low saturation magnetic flux density and low relative permeability can be obtained easily. It is also possible to separately prepare columnar or block-like composite materials by the raw material of a desired composition, and the columnar or block-like composite materials (mold products) can be used as the inner core portion and the outer core portion. The composite materials forming the inner core portion and the outer core portion may have the following properties: the content of the magnetic substance powder is 40 volume percent or more and 75 volume percent or less; the saturation magnetic flux density is 0.6 T or more, preferably 1.0 T or more; the relative permeability is 5 or more and 50 or less, preferably 10 or more and 35 or less. The relative permeability of the magnetic core as a whole may be 5 or more and 50 or less.

Sixth Embodiment

In the sections of the first to fifth embodiments, the description has been given of the mode in which the coil 2 includes one coil element. In other possible mode, a pair of coil elements formed by a spirally wound wire may be included. The pair of coil elements is juxtaposed (paralleled) such that the axes of the elements are parallel to each other. The coil elements are coupled to each other by a couple portion formed by a portion of the wire being folded back (see FIG. 10). It is also possible to employ the mode in which the coil elements are formed by separate wires, and one end portions of the wires respectively forming the coil elements are joined to each other by welding, such as TIG welding, fixation under pressure, soldering and the like. In other possible mode, the one end portions are joined to each other via a separately prepared coupling member. Then, draw-out portions of the wire are covered by a mold resin portion, and the outer circumferential face of each corner portion region covering corresponding corner portion of the draw-out portions is formed by a curved surface. As to other portions, any portion where a corner portion is formed when the mold resin portion is formed so as to conform to the shape of the coil should be formed by a curved surface.

Figure 10:
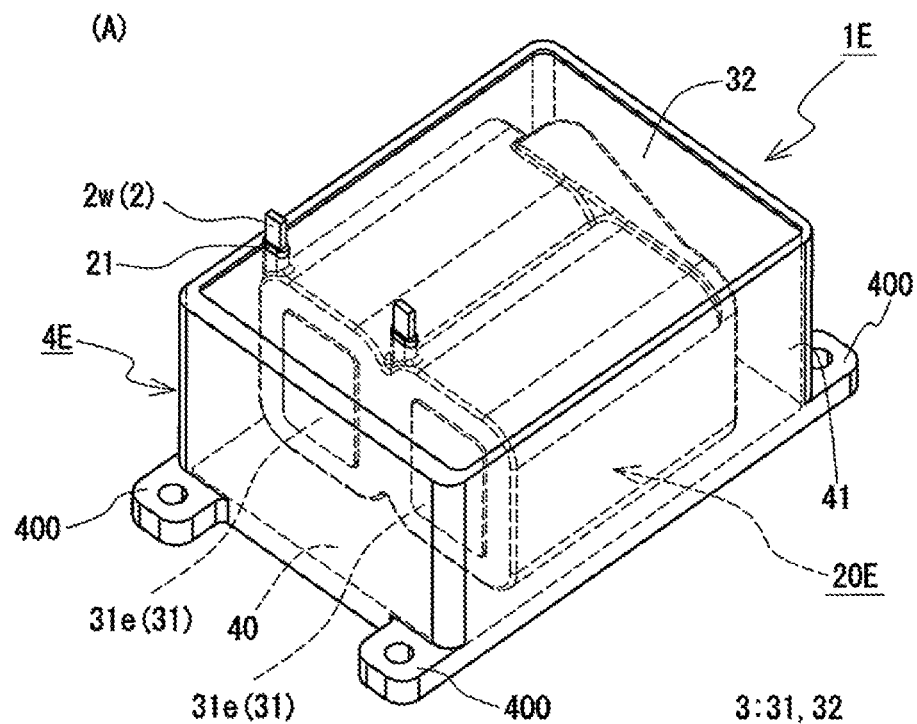
FIG. 10(A) is a schematic perspective view showing a reactor according to a sixth embodiment.
FIG. 10(B) is a schematic perspective view of a coil mold product included in the reactor.
Figure 10:
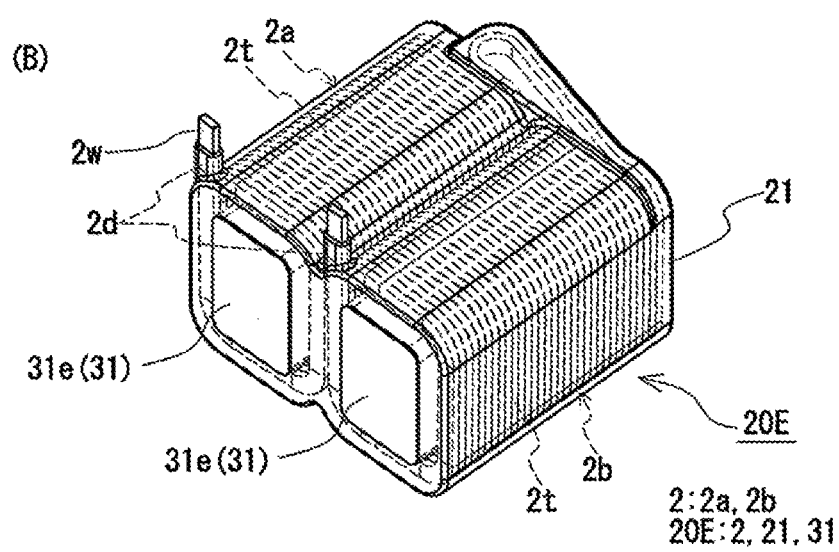

A reactor 1E according to the sixth embodiment shown in FIG. 10 is different from the reactor 1A according to the first embodiment in that a coil 2 includes a pair of coil elements 2a and 2b, and an inner core is provided in each of the coil element, and the basic structure is the same. That is, a coil mold product 20E (see FIG. 10(B)) in which the coil 2 having a turn portion 2t and draw-out portions 2d, and inner core portions 31 are integrally retained by the mold resin portion 21, and an outer core portion 32 are stored in a bottomed sleeve-like case 4E (see FIG. 10(A)). The outer circumferential side of the coil mold product 20E is covered by the outer core portion 32 formed by a composite material (a resin containing mold product) containing magnetic substance powder and resin. In the following, a description will be given focusing on the differences.

[Coil Mold Product]

In the present embodiment, as shown in FIG. 10(B), the coil 2 is formed by a pair of coil elements 2a and 2b, and the coil elements are juxtaposed (paralleled) such that their respective axes are parallel to each other. The coil 2 (the coil elements 2a and 2b) is formed by a continuous wire 2w. Specifically, after one coil element 2a is formed from one end side to the other end side, the wire 2w is bent to form a U-shape on the other end side. Then, other coil element 2b is formed from the other end side to the one end side. The winding direction is identical between the coil elements 2a and 2b. The coil elements 2a and 2b are connected in series electrically. Then, the opposite end portions of the wire 2w are drawn out from the one end side of the coil 2 (the coil elements 2a and 2b) in the radial direction of the coil 2 (the top side in FIG. 10). Further, though the end face shape of each of the coil elements 2a and 2b is quadrangular whose corner portions are rounded, as described above, the end face shape of each of the coil elements 2a and 2b can be selected as appropriate, such as a racetrack shape or a circle.

[Inner Core Portion and Outer Core Portion]

The inner core portions 31 are respectively disposed inside the coil elements 2a and 2b, and each have a prism shape conforming to the inner circumferential shape of the coil elements 2a and 2b. On the other hand, the outer core portion 32 is formed by molding the composite material using the case 4E as a mold assembly as described in the section of the first embodiment.

In the present embodiment, the description has been given of the coil mold product 20E integrally including also the inner core portions 31. However, similarly to the coil mold product 20C described in the section of the third embodiment, it is also possible to employ a coil mold product with no inner core portion. Further, the inner core portions 31 are not limited to be the powder magnetic cores, and may be composite materials (mold products) that are separately fabricated using mold assemblies, as described in the section of the fifth embodiment. Further, similarly to the coil mold product 20B described in the section of the second embodiment, a groove surrounding the wire 2w may be formed at each end face of the mold resin portion 21 covering the draw-out portions 2d of the coil 2.

Seventh Embodiment

In the section of the sixth embodiment, the description has been given of the mode in which the outer core portion 32 formed by the composite material (the mold product) is formed so as to cover the outer circumferential side of the coil mold product 20E, using the case 4E as a mold assembly. In other possible mode, in the reactor 1E according to the sixth embodiment, part of the coil mold product (e.g., the region on the opening side of the case) may be exposed outside the outer core portion and sealed by a sealing resin. Further, the outer core portion can be formed as core pieces similarly to the inner core portions. The magnetic core may be formed by a plurality of core pieces coupled to one another.

Figure 11:
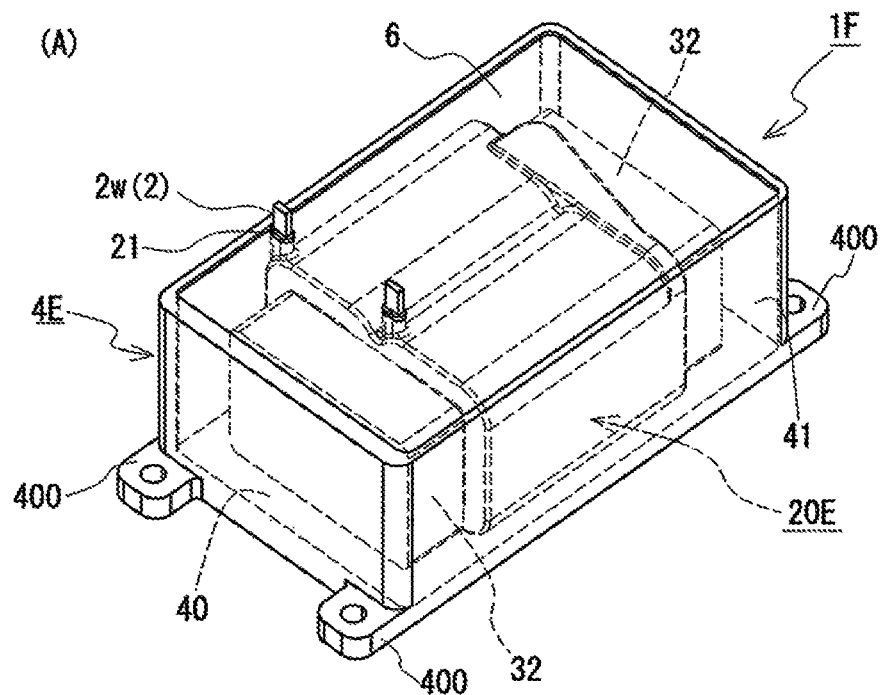
FIG. 11(A) is a schematic perspective view showing a reactor according to a seventh embodiment.
FIG. 11(B) is a schematic exploded perspective view of a combined product made up of a coil mold product and outer core portions included in the reactor.
Figure 11:
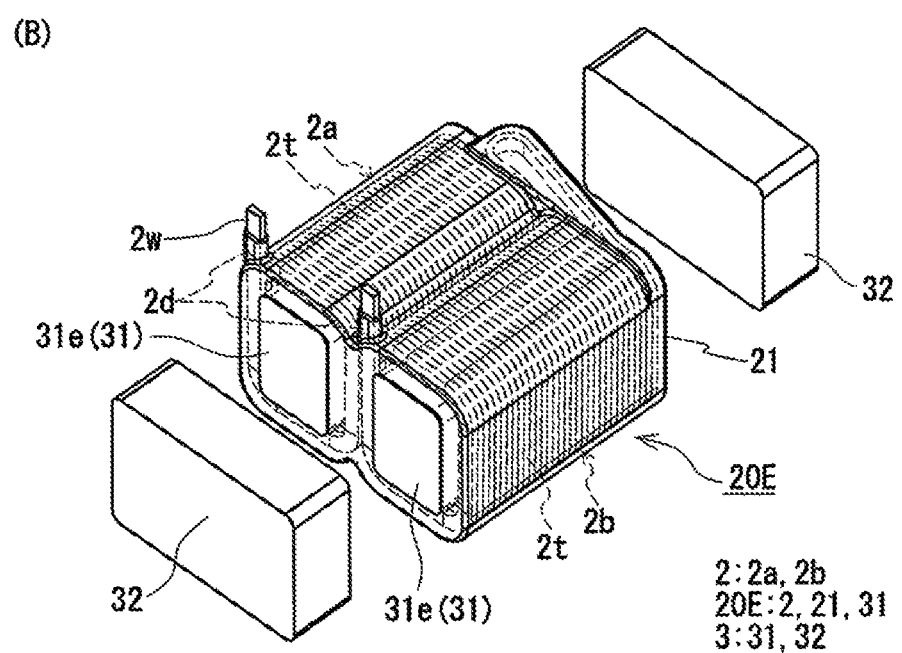

A reactor 1F according to a seventh embodiment shown in FIG. 11 is different from the reactor 1E according to the sixth embodiment in that the outer core portions 32 are core pieces separately fabricated. The reactor 1F is basically the same as the reactor 1E according to the sixth embodiment in including the coil mold product 20E in which the coil 2 and the inner core portions 31 are integrally retained by the mold resin portion 21, and in that the coil mold product 20E is stored in the case 4E (see FIG. 11(A)). In the following, a description will be given focusing on the differences.

[Outer Core Portions]

The outer core portions 32 are each block-shaped, as shown in FIG. 11(B). The outer core portions 32 are respectively disposed on the opposite ends of the inner core portions 31 such that the inner core portions 31 are interposed therebetween. By the outer core portions 32 being coupled to the end faces of the inner core portions 31, an annular magnetic core 3 is formed by the inner core portions 31 and the outer core portions 32, and a closed magnetic path is formed by the magnetic core 3. The inner core portions 31 and the outer core portions 32 can be joined to each other using an adhesive agent, for example. In place of employing the outer core portions 32 of powder magnetic cores, it is also possible to employ composite materials (mold products) separately fabricated using mold assemblies, as described in the section of the fifth embodiment.

[Sealing Resin]

Further, in connection with the reactor 1F according to the seventh embodiment shown in FIG. 11, disposing and integrating the outer core portions 32 at the opposite end portions of the inner core portions 31, respectively, a combined product made up of the coil mold product 20E and the outer core portions 32 (i.e., a combined product made up of the coil 2 and the magnetic core 3) is stored in the case 4E. Thereafter, a sealing resin 6 is packed, and the surrounding of the combined product is sealed by the sealing resin 6. That is, being different from the reactor 1E according to the sixth embodiment, the outer circumferential side of the coil mold product 20E is covered by the sealing resin 6 and not by the composite material forming the outer core portion. As the sealing resin 6, for example, epoxy resin, urethane resin, silicone resin, unsaturated polyester resin, PPS resin or the like can be preferably used. The sealing resin 6 may be mixed with a filler made of a non-magnetic substance such as ceramic, e.g., alumina or silica, from the viewpoint of improving the heat dissipating characteristic.

In the present embodiment, since the mold resin portion 21 is formed so as to cover the turn portion 2t and the draw-out portion 2d of the coil 2, the sealing resin 6 will not be brought into contact with the turn portion 2t or the draw-out portions 2d. Accordingly, as the filler mixed into the sealing resin 6, it is also possible to use a conductive material being a non-magnetic substance, such as aluminum or carbon. Further, though the combined product is stored in the case 4E and surrounding of the combined product is sealed by potting using the sealing resin 6, in place of the foregoing manner, the surrounding of the combined product can be sealed by molding using a sealing resin and a mold assembly. In this situation, even when the case is dispensed with, the coil mold product or the outer core portion can be protected from the external environment and can be provided with mechanical protection.

Eighth Embodiment

The reactor according to each of the first to seventh embodiments can be used, for example, as a constituent component of a converter mounted on a vehicle or the like, or as a constituent component of a power converter apparatus including the converter.

Figure 12:
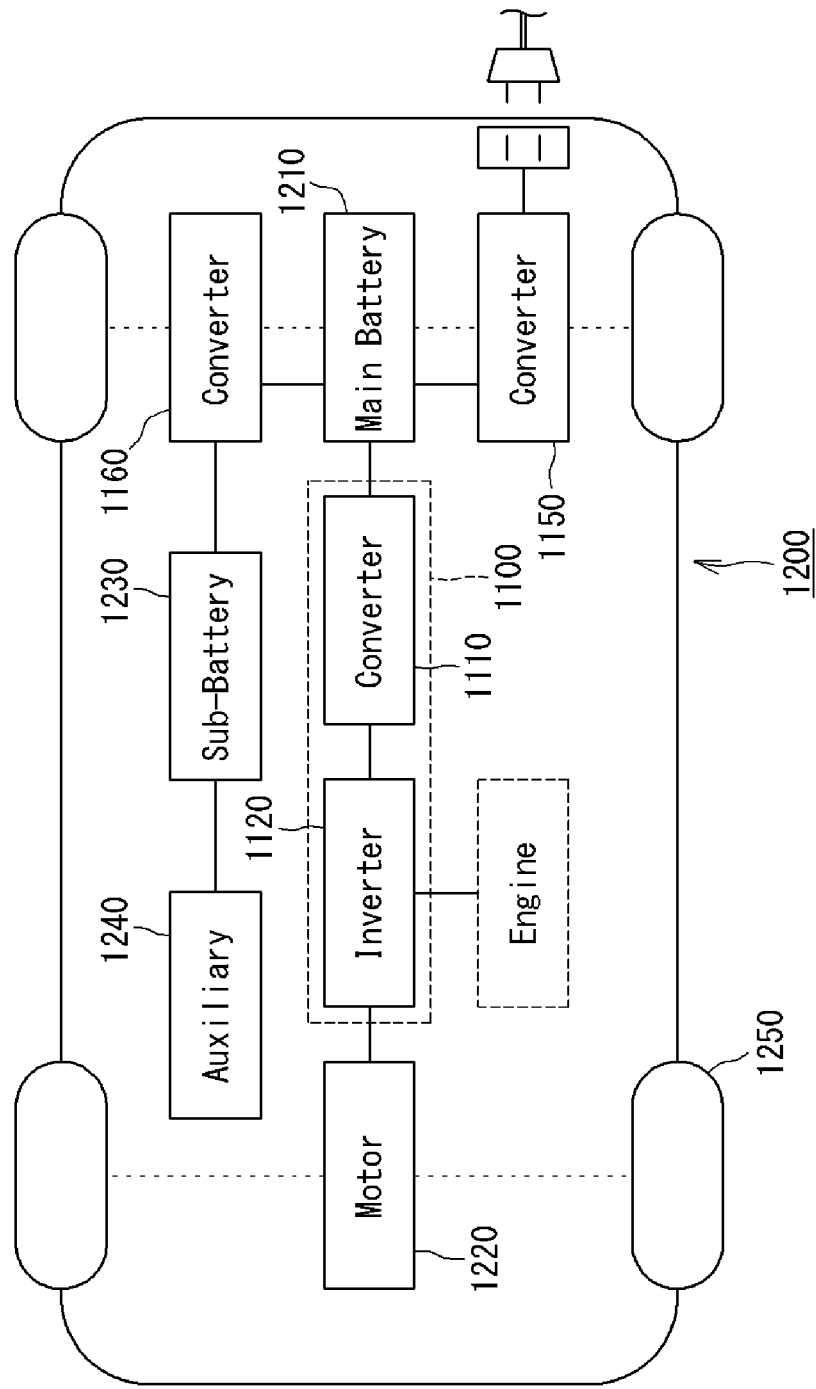
FIG. 12 is a schematic configuration diagram schematically showing a power supply system of a hybrid vehicle.

For example, as shown in FIG. 12, a vehicle 1200 such as a hybrid vehicle or an electric vehicle includes a main battery 1210, a power converter apparatus 1100 connected to the main battery 1210, and a motor (load) 1220 driven by power supplied from the main battery 1210 and used for traveling. The motor 1220 is representatively a three-phase alternating current motor. The motor 1220 drives wheels 1250 in the traveling mode and functions as a generator in the regenerative mode. When the vehicle is a hybrid vehicle, the vehicle 1200 includes an engine in addition to the motor 1220. Though an inlet is shown as a charging portion of the vehicle 1200 in FIG. 12, a plug may be included.

The power converter apparatus 1100 includes a converter 1110 connected to the main battery 1210, and an inverter 1120 connected to the converter 1110 to perform interconversion between direct current and alternating current. When the vehicle 1200 is in the traveling mode, the converter 1110 in the present embodiment steps up DC voltage (input voltage) of approximately 200 V to 300 V of the main battery 1210 to approximately 400 V to 700 V, and supplies the inverter 1120 with the stepped up power. Further, in the regenerative mode, the converter 1110 steps down DC voltage (input voltage) output from the motor 1220 through the inverter 1120 to DC voltage suitable for the main battery 1210, such that the main battery 1210 is charged with the DC voltage. When the vehicle 1200 is in the traveling mode, the inverter 1120 converts the direct current stepped up by the converter 1110 to a prescribed alternating current, and supplies the motor 1220 with the converted power. In the regenerative mode, the inverter 1120 converts the AC output from the motor 1220 into direct current, and outputs the direct current to the converter 1110.

Figure 13:
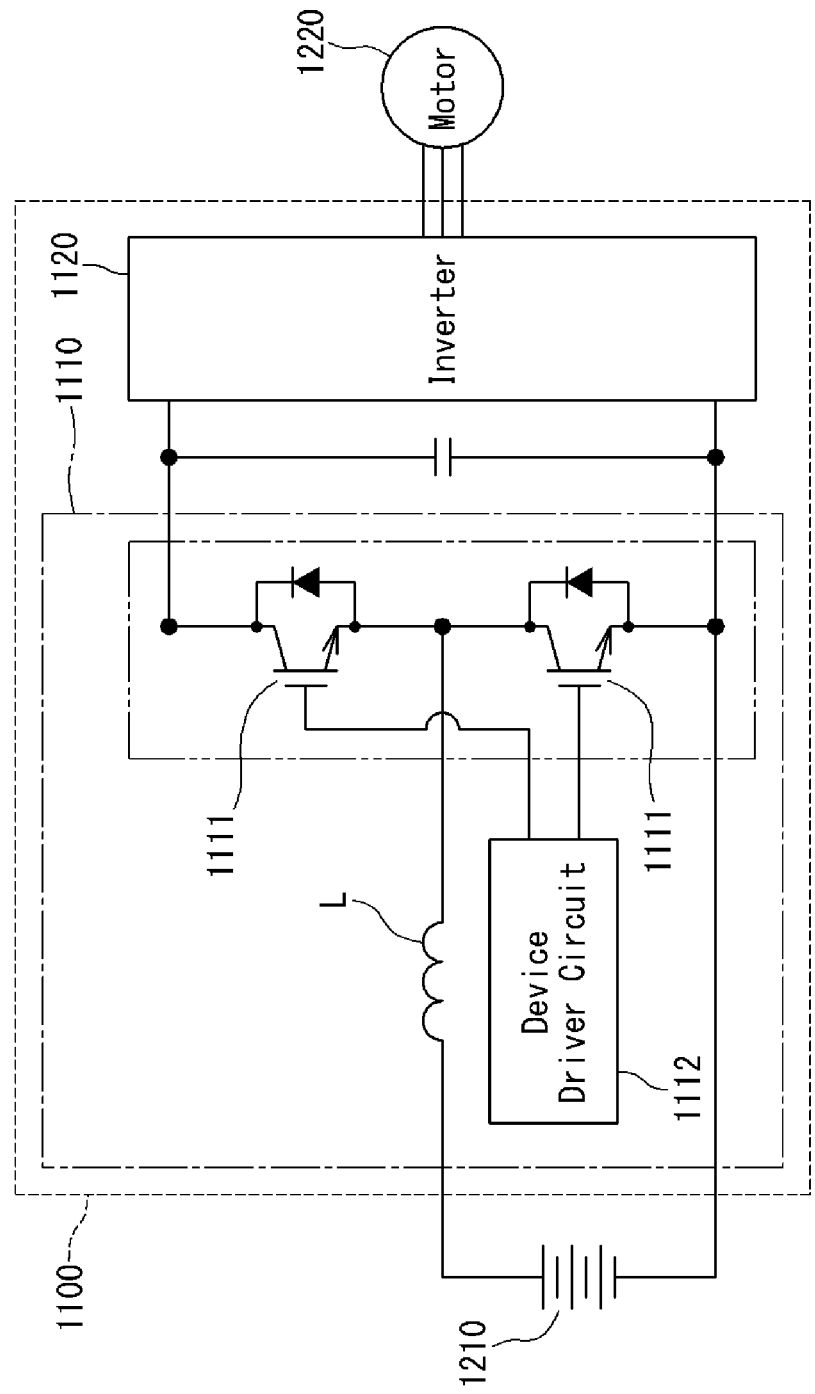
FIG. 13 is a schematic circuit diagram showing an example of a power converter apparatus of the present invention including a converter of the present invention.

As shown in FIG. 13, the converter 1110 includes a plurality of switching elements 1111, a driver circuit 1112 that controls operations of the switching elements 1111, and a reactor L. The converter 1110 converts (herein, performs step up and down) the input voltage by repetitively performing ON/OFF (switching operations). As the switching elements 1111, power devices such as FETs and IGBTs are used. The reactor L uses a characteristic of a coil that disturbs a change of current which flows through the circuit, and hence has a function of making the change smooth when the current is increased or decreased by the switching operation. The reactor L is the reactor according to any of the first to seventh embodiments. Since the reactor 1A and others whose magnetic core is not easily damaged even when being subjected to thermal expansion and contraction associated with the heat cycle or vibrations invited by the coil being supplied with alternating current, the power converter apparatus 1100 and the converter 1110 can also be used for a long period.

The vehicle 1200 includes, in addition to the converter 1110, a power supply apparatus-use converter 1150 connected to the main battery 1210, and an auxiliary power supply-use converter 1160 connected to a sub-battery 1230 serving as a power supply of auxiliary equipment 1240 and to the main battery 1210, to convert a high voltage of the main battery 1210 to a low voltage. The converter 1110 representatively performs DC-DC conversion, whereas the power supply apparatus-use converter 1150 and the auxiliary power supply-use converter 1160 perform AC-DC conversion. Some types of the power supply apparatus-use converter 1150 perform DC-DC conversion. The power supply apparatus-use converter 1150 and the auxiliary power supply-use converter 1160 each may include a reactor structured similarly to the reactor according to the first to seventh embodiments, and the size and shape of the reactor may be changed as appropriate. Further, the reactor according to any of the foregoing first to seventh embodiments may be used as a converter that performs conversion for the input power and that performs only stepping up or stepping down.

<<Test Example>>

As test examples, Samples 1 and 2 were prepared, which differ from each other in the bend radius R of the outer circumferential face of the corner portion region 21a of the mold resin portion 21 covering the draw-out portions 2d in the reactor 1A according to the first embodiment having been described with reference to FIGS. 1 to 3. Herein, the mold resin portion 21 was formed by epoxy resin containing a filler (thermal conductivity: 2 W/m·K). The outer core portion 32 was formed by a composite material of coated powder and epoxy resin, the coated powder including particles of an iron base material (pure iron) whose average particle size was 75 μm or less and whose surface was provided with an insulating coat (the content of pure iron powder in the composite material: 40 volume percent). The thickness a of the wire 2w of the samples was 1.0 mm, and the covering thickness m of the mold resin portion 21 was 2.0 mm. Then, with the prepared reactors of Samples 1 and 2, a heat cycle test was performed, in which the ambient temperature was repetitively varied from −30° C. to 125° C. The heat cycle test was performed for 1000 cycles, and each cycle took 60 minutes. The bend radius R1 in each sample and the test result thereof are summarized in Table 1.

TABLE 1

| Sample No. | Bend Radius R1 (mm) | Presence/Absence of Crack |
| --- | --- | --- |
| 1 | 2.0 | Absent |
| 2 | 0.5 | Present |

<<Result>>

Sample 1 whose bend radius R1 was greater than 0.5 mm which was greater than the bend radius of the mold releasing purpose curved surface showed no fissure or crack in the outer core portion, and no damage was done to the outer core portion. On the other hand, Sample 2 whose bend radius R1 was 0.5 mm or less which was about as great as the bend radius of the mold releasing purpose curved surface showed a crack in the outer core portion, and the outer core portion was damaged. That is, it was found that, setting the bend radius R1 to be greater than 0.5 mm, a crack will not easily occur in the outer core portion. Further, it was found that the bend radius R1 being about as great as the bend radius of the mold releasing purpose curved surface, which is 0.5 mm or less, is not effective in suppressing an occurrence of a crack in the outer core portion.

Note that the present invention is not limited to the embodiments described above, and can be changed as appropriate without deviating from the gist of the present invention.

INDUSTRIAL APPLICABILITY

The reactor of the present invention can be used as a constituent component of a power converter apparatus, such as a DC-DC converter mounted on a vehicle such as a hybrid vehicle, a plug-in hybrid vehicle, an electric vehicle, and a fuel cell vehicle, or a converter of an air conditioner. The reactor-use coil mold product of the present invention can be used as a constituent component of the reactor used for the power converter apparatus.

REFERENCE SIGNS LIST 1A, 1B, 1D, 1E, 1F: REACTOR
2: COIL
2w: WIRE
2t: TURN PORTION
2d: DRAW-OUT PORTION
2a, 2b: COIL ELEMENT
20A, 20B, 20C, 20D, 20E: COIL MOLD PRODUCT
21: MOLD RESIN PORTION
21e: END FACE
21a: CORNER PORTION REGION
21o: OUTER CIRCUMFERENTIAL EDGE REGION
21i: INNER CIRCUMFERENTIAL EDGE REGION
3: MAGNETIC CORE
31: INNER CORE PORTION
31e: END FACE
32: OUTER CORE PORTION
4A, 4B, 4D, 4E: CASE
40: BOTTOM PORTION
41: WALL PORTION
400: ATTACHING PORTION
50: GROOVE
6: SEALING RESIN
1100: POWER CONVERTER APPARATUS
1110: CONVERTER
1111: SWITCHING ELEMENT
1112: DRIVER CIRCUIT
L: REACTOR
1120: INVERTER
1150: POWER SUPPLY APPARATUS-USE CONVERTER
1160: AUXILIARY POWER SUPPLY-USE CONVERTER
1200: VEHICLE
1210: MAIN BATTERY
1220: MOTOR
1230: SUB-BATTERY
1240: AUXILIARY EQUIPMENT
1250: WHEELS

The invention claimed is:

1. A reactor comprising:
a coil and a magnetic core, the coil including a turn portion formed by a wound wire whose cross-sectional shape has a corner portion, the coil further including a draw-out portion of the wire drawn out from the turn portion, the magnetic core being disposed inside and outside the coil to form a closed magnetic path;
a mold resin portion that covers the turn portion and at least part of the draw-out portion to retain a shape of the coil; and
a resin containing mold product that is formed to cover at least part of an outer circumference of the mold resin portion covering the draw-out portion, wherein
in the mold resin portion, an outer circumferential face of a corner portion region that covers a corner portion of the draw-out portion is formed by a curved surface,
when a bend radius of the outer circumferential face of the corner portion region is R, the bend radius R is greater than 0.5 mm,
the wire is formed by a rectangular wire, and
when a thickness of the rectangular wire is a and a thickness of the mold resin portion covering the draw-out portion is m, the bend radius R is $0.2(m+(a/2)) \leq R \leq 5.0(m+(a/2))$.

2. The reactor according to claim 1, wherein
in the magnetic core, an outer circumferential side of the draw-out portion is formed by a composite material containing magnetic substance powder and resin.

3. The reactor according to claim 1, wherein
the mold resin portion is molded using a mold assembly, and
the bend radius of the outer circumferential face of the corner portion region is greater than a bend radius of a mold releasing purpose curved surface that is formed at a corner portion of an assembled product including the coil and the mold resin portion, in order to release the assembled product from the mold assembly.

4. The reactor according to claim 1, wherein
in the mold resin portion, a bend radius of an outer circumferential face of an outer circumferential edge region covering an outer circumferential edge of the turn portion is greater than 0.5 mm.

5. The reactor according to claim 1, wherein
in the mold resin portion, a bend radius of an outer circumferential face of an inner circumferential edge region covering an inner circumferential edge of the turn portion is greater than 0.5 mm.

6. The reactor according to claim 1, wherein
the magnetic core includes:
an inner core portion disposed inside the coil; and
an outer core portion disposed outside the coil, to form the closed magnetic path with the inner core portion, wherein
the inner core portion is integrally retained with the coil by the mold resin portion.

7. The reactor according to claim 1, wherein
the coil includes a juxtaposed pair of coil elements.

8. The reactor according to claim 1, further comprising
a groove that surrounds the wire at an end face of the mold resin portion covering the draw-out portion.

9. The reactor according to claim 1, wherein
the magnetic core includes the outer core portion that is disposed outside the coil and that is formed by the composite material containing magnetic substance powder and resin, wherein at least part of the mold resin portion covering the draw-out portion is exposed outside the outer core portion.

10. A converter comprising the reactor according to claim 1.

11. A coil mold product comprising:
a coil and a mold resin portion, the coil including a turn portion formed by a wound wire whose cross-sectional shape has a corner portion, the coil further including a draw-out portion of the wire drawn out from the turn portion, the mold resin portion covering the turn portion and at least part of the draw-out portion to retain a shape of the coil, the coil mold product being used as a constituent member of a reactor, wherein
in the mold resin portion, an outer circumferential face of a corner portion region that covers a corner portion of the draw-out portion is formed by a curved surface,
when a bend radius of the outer circumferential face of the corner portion region is R, the bend radius R is greater than 0.5 mm,
the wire is formed by a rectangular wire, and
when a thickness of the rectangular wire is a and a thickness of the mold resin portion covering the draw-out portion is m, the bend radius R is $0.2(m+(a/2)) \leq R \leq 5.0(m+(a/2))$.

12. A power converter apparatus comprising the converter according to claim 10.

* * * * *